(12) United States Patent
Kobayashi

(10) Patent No.: US 7,772,479 B2
(45) Date of Patent: Aug. 10, 2010

(54) INFORMATION PROCESSING APPARATUS, INFORMATION PROCESSING METHOD AND PROGRAM

(75) Inventor: Yoshiyuki Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1471 days.

(21) Appl. No.: 11/125,542

(22) Filed: May 9, 2005

(65) Prior Publication Data

US 2005/0273818 A1  Dec. 8, 2005

(30) Foreign Application Priority Data

May 11, 2004  (JP)  ............... 2004-140602

(51) Int. Cl.
*G10H 1/00*  (2006.01)
(52) U.S. Cl. ............... 84/612; 84/600; 84/652; 84/636
(58) Field of Classification Search ........... 84/600–602, 84/612, 636, 652, 668
See application file for complete search history.

(56) References Cited

U.S. PATENT DOCUMENTS

| | | | | |
|---|---|---|---|---|
| 5,220,120 | A * | 6/1993 | Mukaino | 84/636 |
| 6,449,661 | B1 * | 9/2002 | Fujishima | 710/5 |
| 6,933,432 | B2 * | 8/2005 | Shteyn et al. | 84/609 |
| 7,335,833 | B2 * | 2/2008 | Smith et al. | 84/601 |
| 7,521,623 | B2 * | 4/2009 | Bowen | 84/612 |
| 7,521,624 | B2 * | 4/2009 | Asukai et al. | 84/612 |
| 2002/0091049 | A1 * | 7/2002 | Hisano et al. | 482/148 |
| 2002/0155416 | A1 * | 10/2002 | Barton | 434/247 |
| 2003/0094093 | A1 * | 5/2003 | Smith et al. | 84/609 |
| 2003/0183064 | A1 * | 10/2003 | Eugene et al. | 84/609 |
| 2003/0205124 | A1 * | 11/2003 | Foote et al. | 84/608 |
| 2005/0081700 | A1 * | 4/2005 | Kikumoto | 84/604 |
| 2005/0223879 | A1 * | 10/2005 | Huffman | 84/612 |
| 2005/0273818 | A1 * | 12/2005 | Kobayashi | 725/46 |
| 2006/0048634 | A1 * | 3/2006 | Lu et al. | 84/612 |
| 2006/0095147 | A1 * | 5/2006 | Van De Kerkhof et al. | 700/61 |
| 2007/0044641 | A1 * | 3/2007 | McKinney et al. | 84/612 |
| 2007/0074619 | A1 * | 4/2007 | Vergo | 84/612 |
| 2008/0109488 | A1 * | 5/2008 | Hempleman et al. | 707/104.1 |
| 2008/0126384 | A1 * | 5/2008 | Toms et al. | 707/102 |
| 2008/0184869 | A1 * | 8/2008 | Smith et al. | 84/609 |
| 2008/0257133 | A1 * | 10/2008 | Sasaki et al. | 84/604 |
| 2009/0158155 | A1 * | 6/2009 | Quinn et al. | 715/716 |

FOREIGN PATENT DOCUMENTS

| | | |
|---|---|---|
| JP | 2001-306580 | 11/2001 |
| JP | 2002-333892 | 11/2002 |
| JP | 2003-015666 | 1/2003 |
| JP | 2003-118421 | 4/2003 |
| JP | 2003-178088 | 6/2003 |
| WO | WO 2006/025487 | 3/2006 |

* cited by examiner

*Primary Examiner*—David S Warren
(74) *Attorney, Agent, or Firm*—Finnegan, Henderson, Farabow, Garrett & Dunner L.L.P.

(57) ABSTRACT

The recommended playlist creating section generates several recommended candidate playlists having different reproduction orders as recommended candidate playlists each indicating a recommended reproduction order when one or more contents are sequentially reproduced. The evaluating section evaluates how each of the recommended candidate playlist is close to the ideal fluctuation stored in the ideal fluctuation storing section. The recommended playlist creating section selects a recommended playlist from among the recommended candidate playlists based on a result of evaluation by the evaluating section. This present invention is applicable to a content reproducing unit having a playlist creating function.

4 Claims, 9 Drawing Sheets

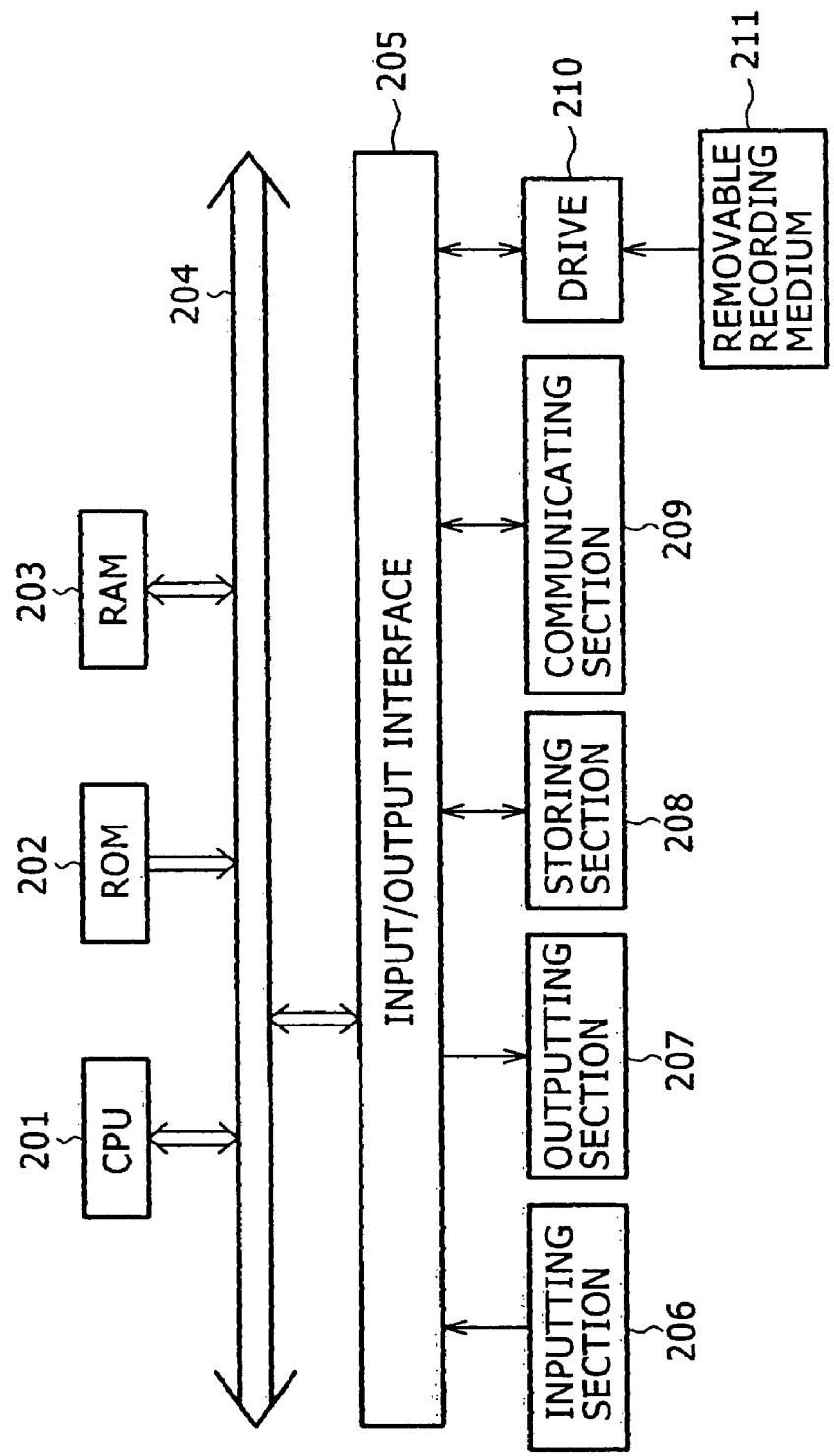

INFORMATION PROCESSING APPARATUS, INFORMATION PROCESSING METHOD AND PROGRAM

BACKGROUND OF THE INVENTION

The present invention relates to an information processing apparatus and a method, and a program for the same, and more specifically to an information processing apparatus and a method, and a program for the same which can freely create a playlist with an ideal reproduction order for a user independent from a creation timing or length.

Recently, reproducing devices capable of reproducing music are equipped with a function of creating a list enlisting a plurality of pieces of music in a reproducing order, and a function of reproducing a plurality of pieces of music in accordance with the list. (refer to Patent Document 1 and Patent Document 2)

A list created by the former function is referred to as a playlist, and the function as a playlist creating function hereinafter. A process of the reproducing device implementing the playlist creating function is referred to as a playlist creating process. The latter function is referred to as a playlist reproducing function, and a process of the reproducing device corresponding to the playlist reproducing function is referred to as a playlist reproducing process.

Patent Document 1:

Japanese Patent Laid-Open No. Hei 15-015666

Patent Document 2:

Japanese Patent Laid-Open No. Hei 15-178088

However, in the related art, a playlist creating function has following three problems.

A first problem is a problem that a change pattern of a feature quantity for each of piece of music during the playlist reproduction process is required to be previously decided in the playlist creating process.

A feature quantity of a piece of music is used to designate such as tempo, mood, melody, chord progression, and sound quantity or the like. A change of feature quantity is used to designate a temporal transition (time-series) in a level (value) of a prespecified feature quantity.

More specifically, the first problem is therefore a necessity for preparing in advance a change pattern in a feature quantity, such as "the music starts with a fast tempo, then slows down, and comes back to a fast tempo towards the end of the music", and input the pattern to the playlist reproducing device during the playlist creating process.

A second problem is that a playlist creating process is executed during a reproduction of piece of music is carried out without using a playlist, and a playlist to be created as the result becomes a few playlist with the past reproduction flow incorporated therein.

In other words, the second problem is that a reproduction history is not considered in the related art playlist creating function, and as a result there is a fear that contents hitherto reproduced without a playlist does not link smoothly to a playlist created with the related art playlist creating function.

A third problem is that it is difficult to create a playlist in which reproduction infinitely continues with no collapse in the contents array in the related art playlist creating function.

A third problem is as follows. In the related art playlist creating function, the length of a playlist is not variable but needs to be decided in advance. Therefore, the related art playlist creating function does not have an infinite length in a change pattern of feature quantity, and this is one of a factor leading to generate the problem. As a result, the problem arises that it is very difficult to create a playlist having an infinite length.

Consequently, instead of creating a playlist having an infinite length, an idea in which a plurality of playlists created by using the related art playlist creating function are sequentially reproduced can be considered. However, if two different playlists are sequentially reproduced according to this idea, a similar factor to the factor leading to generate the second problem, that is, the two playlists may not link smoothly because the two playlists are mutually independent and are not taken in consideration. This similar factor to the factor generating the second problem is also one of the factors leading to generate the third problem.

The first through third problems described hereinabove arise not only regarding musical pieces but also with regarding images and other contents.

SUMMARY OF THE INVENTION

It is desirable to provide a device which makes possible to freely create a playlist with an ideal reproduction order for a user independent from a creation timing or length.

According to an aspect of the present invention, there is provided an information processing apparatus including: a first generating unit for generating first information indicating time change in a level of a prespecified feature quantity within a reproduction period when one or more contents are sequentially reproduced according to a prespecified reproduction order; a second generating unit for generating second information indicating a distribution of frequency components of the prespecified feature quantity included within the reproduction period through frequency analysis of the first information generated by the first generating unit; a storing unit for previously storing third information indicating a distribution pattern previously determined as ideal to a user among a plurality of distribution patterns of frequency components of the prespecified feature quantity; and a correlation degree computing unit for computing degrees of correlation between the second information generated by the second generating unit and the third information stored in the storing unit.

The information processing apparatus according to the present invention further includes: a candidate creating unit for creating M sets of playlist candidates indicating M types of reproduction orders (M is an integer not less than 2 and not more than a factorial of N) each as a candidate of a playlist indicating reproduction order determined appropriate to the user when N sets of contents (N is an integer not less than 2) are sequentially reproduced. Therefore, the first generating unit generates M sets of the first information corresponding to each of cases in which N sets of the contents are sequentially reproduced according to each of the N types of the reproduction orders shown by the M sets of the playlists candidate created by the candidate creating unit respectively; the second generating unit generates M sets of the second information corresponding to the M sets of the first information generated by the first generating unit respectively; the correlation degree computing unit computes degrees of correlation between each of the M sets of the second information generated by the second generating unit and the third information stored in the storing unit respectively; and the information processing apparatus further including a playlist selecting unit for selecting a playlist indicating a reproduction order determined as appropriate to the user from among the M sets of the playlist candidates generated by the candidate creating unit.

The information processing apparatus according to the present invention further includes a candidate deciding unit for deciding N sets or more candidate contents (N is an integer not less than 2). Therefore, the first generating unit can generate each of the N sets of the first information corresponding to the cases in which the N sets of candidate contents decided by the candidate deciding unit are reproduced each as a single body; the second generating unit can generate each of the N sets of the second information corresponding to the N sets of the first information generated by the first generating unit, respectively; the correlation degree computing unit can compute degrees of correlation between each of the N sets of the second information generated by the second generating unit and the third information stored in the storing unit; the information processing apparatus further includes a content selecting unit for selecting contents determined appropriate to the user from the N sets of candidate contents based on the N sets of degrees of correlation computed by the correlation degree computing unit.

According to still further aspect of the present invention, a method of processing information of an information processing apparatus, the method including the steps of: generating first information indicating time change in a level of the prespecified feature quantity within a reproduction period when one or more contents are sequentially reproduced according to a prespecified reproduction order; generating second information indicating a distribution of frequency components in the prespecified feature quantity included within the reproduction period by analyzing frequencies of the first information generated in the process of the first generating step; and computing a degree of correlation between the second information generated in the second generating step and the third information indicating distribution patterns previously determined as ideal to the user among a plurality of distribution patterns of frequency components of the prespecified feature quantity.

According to yet further aspect of the present invention, there is provided a program which is to be executed by a computer, includes the steps of: generating first information indicating time change in a level of the prespecified feature quantity within a reproduction period when one or more contents are sequentially reproduced according to a prespecified reproduction order; generating second information indicating a distribution of frequency components in the prespecified feature quantity included within the reproduction period by analyzing frequencies of the first information generated in the process of the first generating step; and computing a degree of correlation between the second information generated in the second generating step and the third information indicating distribution patterns previously determined as ideal to the user among a plurality of distribution patterns of frequency components of the prespecified feature quantity.

In the information processing apparatus, the method and the program according to the present invention: the first information is generated indicating time change in the level of the prespecified feature quantity, when one or more contents are sequentially reproduced according to the prespecified reproduction order, within the reproduction period; then the second information is generated indicating the results of frequency analysis of the first information, namely, the second information indicating the distribution of frequency components of the prespecified feature quantity included in the reproduction period through frequency analysis of the first information generated in the process of the first generating step; and the degree of correlation is computed between the second information generated in the process of the second generating step and third information indicating the distribution pattern previously determined as ideal to the user among a plurality of distribution patterns of frequency components of the prespecified feature quantity.

BRIEF DESCRIPTION OF THE DRAWINGS

FIG. 12 is a block diagram showing an example of hardware configuration of the content reproducing device according to the present invention.

DETAILED DESCRIPTION OF THE PREFERRED EMBODIMENTS

Embodiments of the present invention are described hereinafter, and the relationship between requirements in the claims and examples in the embodiments is as follows. This description is to confirm that examples supporting the present invention in the claims are described in the description of the preferred embodiments. Accordingly, if there are examples described in the description of preferred embodiments without corresponding requirements in the claims, it does not mean that the examples do not correspond to requirements in the claims. Alternatively, if there are examples described herein as corresponding to requirements in the claims, it does not mean that the examples do not correspond to requirements other than those in the claims.

Further it does not mean that the present invention corresponding to examples described in the description of preferred embodiments is all described in the claims. In other words, the description does not preclude existence of inventions corresponding to examples described in the description of the preferred embodiments but not described in the claims, namely possibility of application in installments or addition of inventions in a revision.

Figure 1:
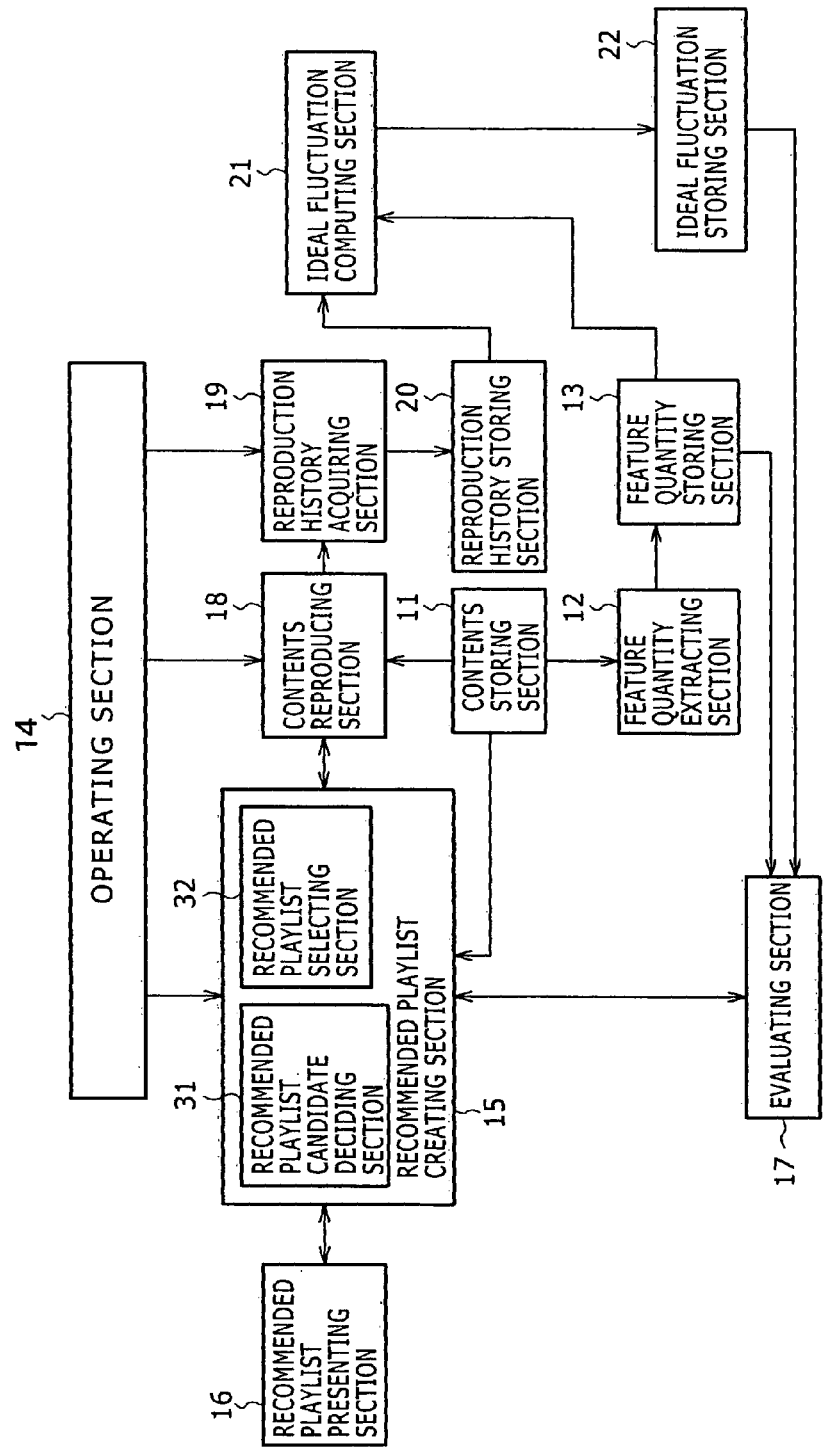
FIG. 1 is a functional block diagram showing an example of functional configuration of a content reproducing device according to the present invention.
Figure 2:
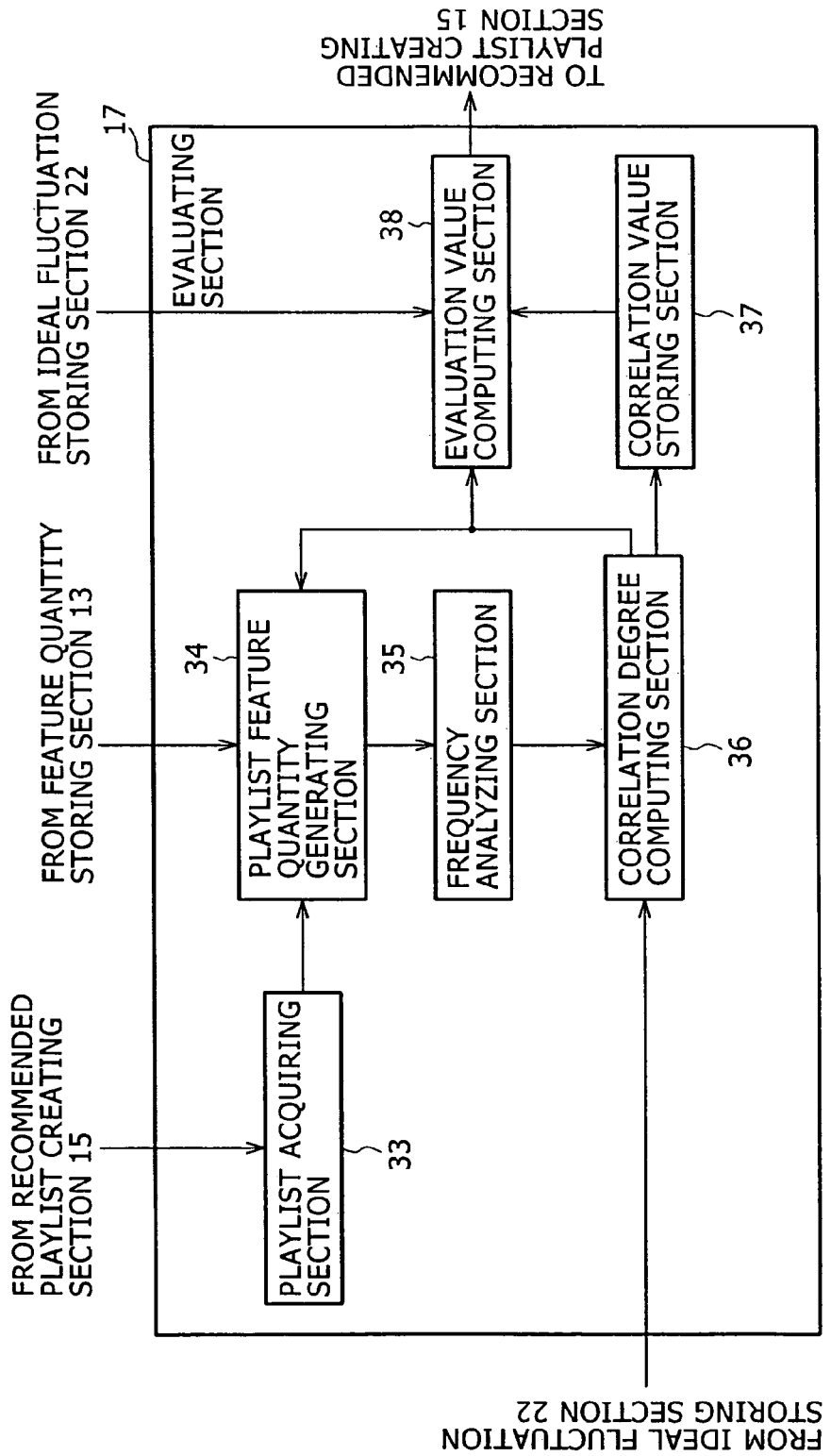
FIG. 2 is a functional block diagram showing in details an example of functional configuration of a evaluating section shown in FIG. 1.
Figure 3:
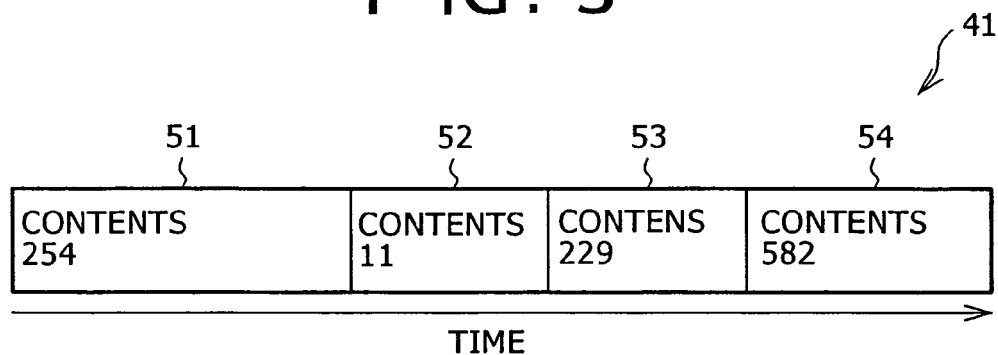
FIG. 3 is a diagram illustrating an example a playlist as a candidate for a recommended playlist.
Figure 4:
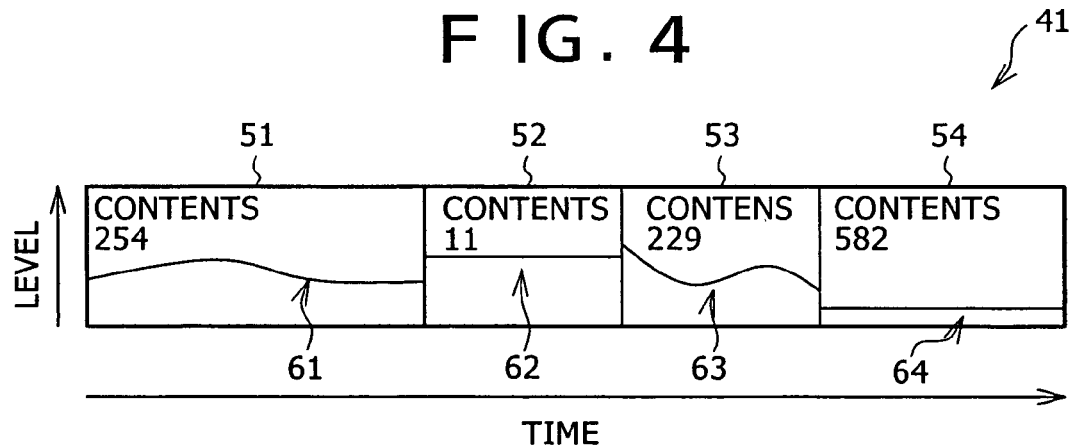
FIG. 4 is a diagram showing an example of a time series feature quantity of each contents included in the playlist shown in FIG. 3.
Figure 5:
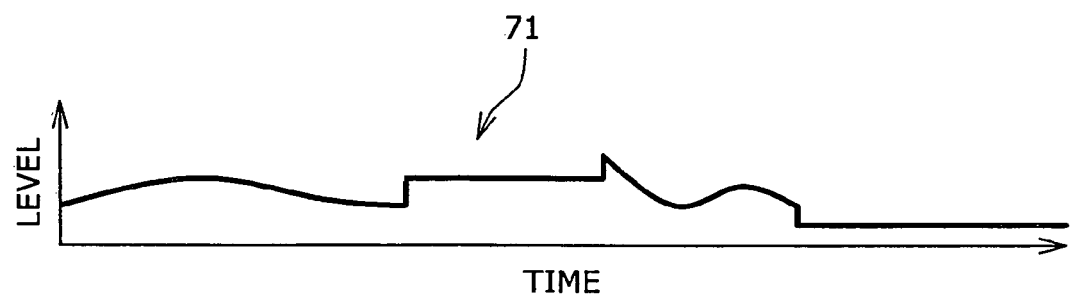
FIG. 5 is a diagram showing an example of information prepared by linking quantities shown in FIG. 4 into one set to indicate a time series feature quantity of the entire playlist shown in FIG. 3.
Figure 10:
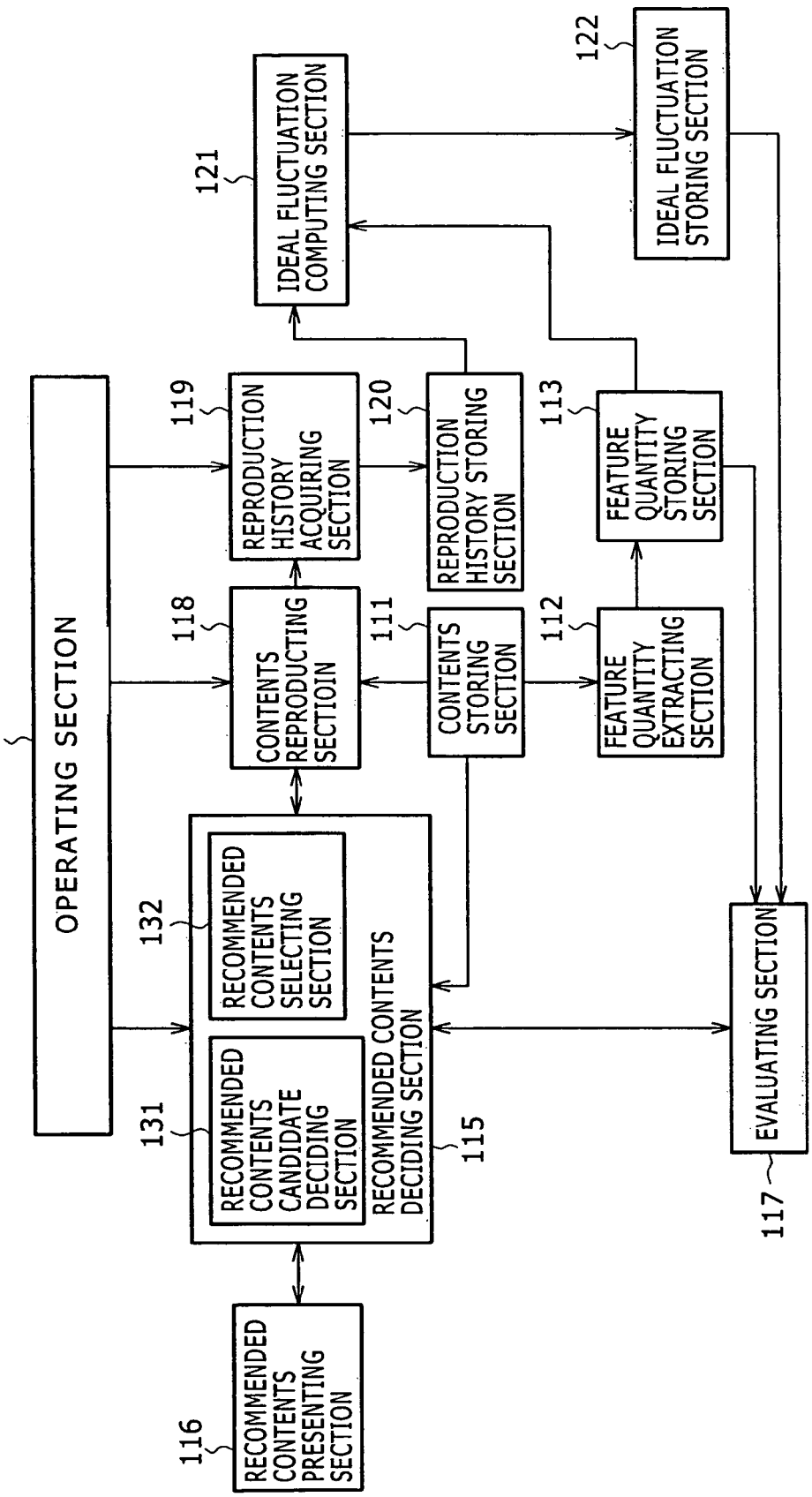
FIG. 10 is a block diagram showing other example of functional configuration of the content reproducing device according to the present invention.
Figure 11:
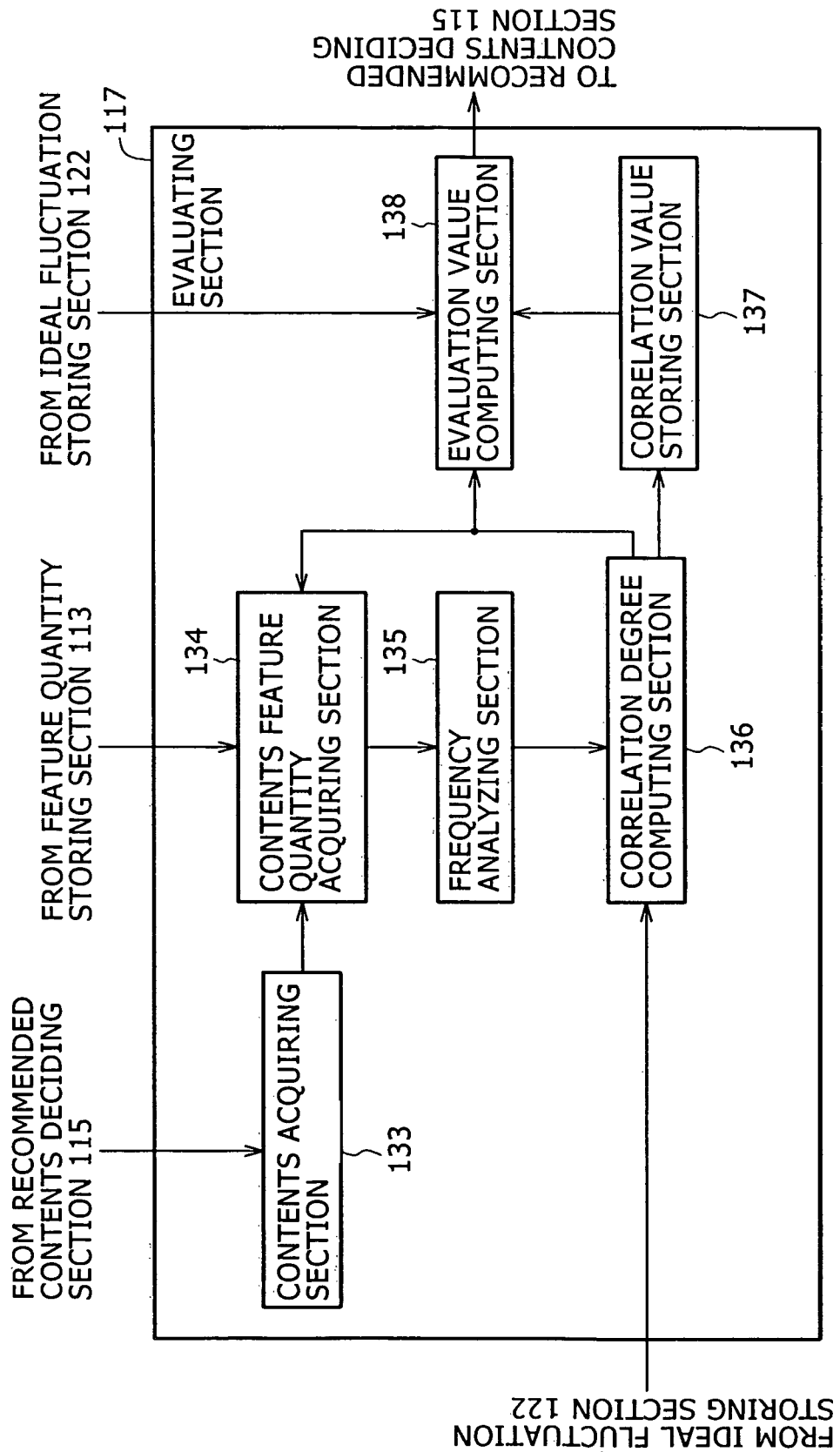
FIG. 11 is a functional block diagram showing in detail an example of functional configuration of an evaluating section shown in FIG. 10.

The present invention provides an information processing apparatus. The information processing apparatus (for example a content reproducing device described in FIG. 1 or FIG. 10), when one or more contents are reproduced successively in a prespecified order (for example contents 51 through 54 are reproduced in that order as shown in FIG. 3) includes:

a first generating unit (for example, a playlist feature quantity generating section 34 in FIG. 2, being part of an evaluating section 17 in FIG. 1, or a contents feature quantity acquiring section 134 in FIG. 11, being part of an evaluating section 117 in FIG. 10), for generating first information indicating time change in a level of a prespecified feature quantity within a reproduction period (for example playlist feature information 71 in FIG. 5 obtained by combining in that order information for time series feature quantity in contents 61 through 64 each indicating time series changes in levels of feature quantity of contents 51 through 54 in FIG. 4);

a second generating unit (for example, a frequency analyzing section 35 in FIG. 2 or a frequency analyzing section 135 in FIG. 11), for generating second information (for example, a result of frequency analysis 81 in FIG. 6), indicating a distribution of frequency components of the prespecified feature quantity included within the reproduction period through frequency analysis of the first information generated by the first generating unit;

a storing unit (for example, an ideal fluctuation storing section 22 in FIG. 1 or an ideal fluctuation storing section 122 in FIG. 10), for previously storing third information (for example, an ideal fluctuation 82 in FIG. 7), indicating distribution patterns previously determined as ideal to a user among a plurality of distribution patterns of frequency components of the prespecified feature quantity; and a correlation degree computing unit (for example, a correlation degree computing section 36 in FIG. 2 or a correlation degree computing section 136 in FIG. 11), for computing degrees of correlation between the second information generated by the second generating unit and the third information stored in the storing unit.

The information processing apparatus, when N (N is an integer not less than 2) sets of contents are reproduced successively on the information processing apparatus (for example a content reproducing device in FIG. 1 in particular), may further include:

a candidate selecting unit (for example, a recommended playlist candidate deciding section 31 of a recommended playlist creating section 15 in FIG. 1), for creating M (M is an integer not less than 2 and not more than the factorial of N) sets of playlist candidates designating each of M types of reproduction orders determined appropriate to the user.

The first generating unit generates M sets of first information corresponding to each of cases in which N sets of contents are reproduced successively in accordance to each of M types of reproduction orders designated by each of M sets of playlist candidates generated by the candidate creating unit.

The second generating unit generates M sets of second information corresponding to each of M sets of the first information generated by the first generating unit.

The correlation degree computing unit computes degrees correlation between each of M sets of the second information generated by the second generating unit and the third information stored in the storing unit.

The information processing apparatus further includes a playlist selecting unit (for example, a recommended playlist selecting section 32 of the recommended playlist creating section 15 in FIG. 1), for deciding playlists indicating reproduction orders determined appropriate to the user from the M sets of the playlist candidates created by the candidate creating unit based on the M sets of the correlations computed with the correlation degree computing unit.

The information processing apparatus (for example, a content reproduction device in FIG. 10 in particular), may further include:

a candidate deciding unit (for example, a contents candidate deciding section 131 of a recommended contents deciding section 115 in FIG. 10), for determining N (N is an integer not less than 2) sets of candidate contents as determined appropriate for the user.

The first generating unit generates N sets of first information corresponding to each of the N sets of candidate contents determined by the candidate deciding unit when each of the candidate contents is reproduced independently.

the second generating unit generates each of the N sets of the second information corresponding to each of the N sets of the first information generated by the first generating unit.

The correlation degree computation unit computes degrees of correlation between each of N sets of the second information generated by the second generating unit and the third information stored in the storing unit.

The information processing apparatus further includes a content selecting unit (for example, a recommended contents selecting section 132 of the recommended contents deciding section 115), for selecting contents determined appropriate to the user from the N sets of candidate contents based on the N sets of degrees of correlation computed by the correlation degree computing unit.

The present invention provides a method of processing information. The method of processing information is for an information processing apparatus (for example, the content reproduction device in FIG. 1), and includes:

a first generating step (for example, a process in step S23 in FIG. 9), for generating first information indicating time change in a level of a prespecified feature quantity of one or more contents in a prespecified reproduction order within a reproduction period;

a second generating step (for example, a process in step S24 in FIG. 9), for generating second information showing a distribution of frequency components in the prespecified feature quantity included within the reproduction period by analyzing frequencies of the first information generated in the process of the first generating step; and a correlation degree computing step (for example, a process in step S25 in FIG. 9), for computing a degree of correlation between the second information generated in the process of the second generating step and third information indicating distribution patterns previously determined as ideal to a user among a plurality of distribution patterns of frequency components of the prespecified feature quantity.

The present invention provides a program for processing information. The program is one for the information processing method as described hereinabove and is executed on a computer with a hardware structure in FIG. 12, for example.

An embodiment of the present invention is described hereinafter with reference to the drawings.

FIG. 1 is a diagram showing an example of a functional configuration of a content reproducing device applied an information processing apparatus according to the present invention.

The content reproducing device in FIG. 1 is equipped with a novel playlist creating function as follows. The novel playlist creating function is namely a function for choosing an ideal playlist for a user, hereinafter referred to as a recommended playlist, from all conceivable playlists, with a round-robin processing or a genetic algorithm.

A novel method is also applied to the novel playlist creating function in selecting a recommended playlist. The novel method is a method of selecting as a recommended playlist a playlist indicating a specific reproduction order when a distribution of frequency components of a prespecified feature quantity, upon reproduction of contents in a prespecified order, approximates a distribution pattern ideal to the user.

It is also possible to freely add extended functionalities to the novel playlist creating function, such as presenting the recommended playlist thus selected to the user.

An ideal pattern for the user from a plurality of patterns in frequency components of a prespecified feature quantity is hereinafter referred to an ideal fluctuation with regards to the prespecified feature. A user, used hereinwith, may refer to a user or a plurality of users including all users. Details about others, including the feature quantity and the ideal fluctuation will be described hereinafter.

In order to implement the novel playlist creating function as described hereinabove, the content reproducing device in FIG. 1 is equipped with a contents storing section 11 through an ideal fluctuation storing section 22.

The contents storing section 11 is set up, for example, as an area on a hard disk, and stores one or more playable contents.

With exactness, the contents storing section 11 stores not a content per se, but data making up the contents. Hereinafter, both the content and the data making up the content are simply referred to as a content, unless there is a need to distinguish the two individually.

The types of contents are not particularly specified. For example a TV program, a movie and an image like a photographic picture may obviously serve as a content. A music piece, or audio, is used herein for the purpose of illustration to be easier, as comparison with the background technology as described hereinabove.

The number of contents stored in the contents storing section 11 is not fixed but may increase or decrease. For example, although not shown in FIG. 1, the content reproducing device may receive a content delivered from a server via network and stores the content on the contents storing section 11. The content reproducing device may also read out a content stored on a removable recording medium and stores the content on the contents storing section 11. In these cases the number of contents stored on the contents storing section 11 increases. At the same time, the content reproducing device can erase a content stored on the contents storing section 11. In this case the number of contents stored on the contents storing section 11 decreases.

Furthermore, the contents storing section 11 is not an essential component of the content reproducing device in FIG. 1. The content reproducing device may also reproduce a content other than that stored on the contents storing section 11, such as a content delivered from a server or a content stored on a removable recording medium as described hereinabove, directly without first storing such a content on the contents storing section 11.

In other words, location of a content in a recommended playlist is not restricted to the contents storing section 11, but may be anywhere, for example, on the server or removable recording medium as described above.

For the purpose of making the description hereinafter simpler, it is assumed that reproduction targets of the content reproducing device in FIG. 1 are limited to the contents stored on the contents storing section 11. Contents included in a recommended playlist are assumedly selected from contents stored on the contents storing section 11 hereinafter.

A feature quantity extracting section 12 is made up, for example, with software. The feature quantity extracting section 12 targets all contents stored on the contents storing section 11 for processing, extracts time changes in a level of a prespecified feature quantity within a reproduction period when each of the processing target contents is reproduced individually, and generates information indicating the same, hereinafter referred to as feature quantity information of a content, for each of the processing target contents. Feature quantity information of each of all the contents is generated by the feature quantity extracting section 12.

The feature quantity extracting section 12 stores the feature quantity information of each of all the contents to a feature quantity storing section 13. The feature quantity storing section 13 is set up, for example, as an area on a hard disk and stores the feature quantity information on each of all the contents stored on the contents storing section 11.

Regarding types of feature quantities, it is not limited to a single type but there may be a plurality of types. For example, for music pieces used herein for illustrations, there are a plurality of types of the feature quantities, for example, tempo, mood, melody, chord progression, and sound quantity, among others. Accordingly, the feature quantity extracting section 12 may generate feature quantity information for any number of any types of feature quantities selected from the plurality of types of the feature quantities, and store them in the feature quantity storing section 13. For the purpose of making the description hereinafter simpler, it is assumed that feature quantity extracting section 12 generates, for example, feature quantity information for each of tempo, mood and sound quantity for each of the music pieces and stores the feature quantity information on the feature quantity storing section 13.

An operating section 14 includes, for example, a keyboard, mouse and other input interfaces. The user can input various information to the content reproducing device in FIG. 1 through operations on the operating section 14.

Specifically, the user can input a recommended playlist creation command, hereinafter referred to as a creation command, to a recommended playlist creating section 15 through operations on the operating section 14.

The user can also input a content reproduction command, hereinafter referred to as a list reproduction command, in accordance to the recommended playlist already created, to a contents reproducing section 18 through operations on the operating section 14. The user can further input a content reproduction command for a desired content without using a recommended reproduction list (hereinafter referred to as a manual reproduction command for the purpose of distinguishing the command from the list reproduction command) to the contents reproducing section 18 through operations on the operating section 14.

The user can also input a user evaluation, details thereof to be described hereinafter, to a reproduction history acquiring section 19 through operations on the operating section 14.

The recommended playlist creating section 15 is set up with software, and generates the recommended playlist at a timing of a creation command supplied from the operating section 14, or at a prespecified timing decided by itself.

The recommended playlist creating section 15 is described in more detail hereinafter.

As is shown in FIG. 1, the recommended playlist creating section 15 includes a playlist candidate deciding section 31 and a recommended playlist selecting section 32.

The playlist candidate deciding section 31 first determines N sets of contents for inclusion in a playlist to be created, namely target contents for reproduction, from contents stored on the contents storing section 11. The number N, to be exact, is an integer not less than 1 as will be described hereinafter, but for now it is assumedly an integer not less than 2.

A method of determining target contents for reproduction is not specifically specified, and for example, a first method of including information for determining the same in a creation command from the operating section 14 may be used, namely, target contents for reproduction are specified by the user. For lightening operational burdens for the user, a second method is used here for the purpose of illustration in which the playlist candidate deciding section 31 generates target contents for reproduction automatically. An automatic process here refers to a process executed at a determination of the processing apparatus or the processing section itself (for example, the playlist candidate deciding section 31) without the user operation by the operating section 14. For a trigger for starting the process, however, an instruction from the user may be used, namely, a command, for example a creation command, from the operating section 14, among others. An automatic process also includes a process executed randomly with a random number series, among others, in addition to a process executed with a prespecified rule. The second method includes a method of determining contents randomly based on a random number series, among others, in addition to a method of determining contents with a prespecified rule.

Accordingly, the playlist candidate deciding section 31 first determines N sets of contents automatically from all the contents stored on the contents storing section 11 as a target for reproduction, at a timing of a creation command supplied from the operating section 14, or at a prespecified timing determined by a determination of itself.

Next the playlist candidate deciding section 31 generates M sets of playlists as recommended playlist candidates containing the N sets of contents determined as target for reproduction with differing arrangement orders, or reproduction orders, from each other. The M sets of recommended playlist candidates corresponding to each of the M types of reproduction orders are generated.

Each of the reproduction orders identified with specified playlists is herein simply referred to as a reproduction order of the specified playlist.

The number M of the recommended playlist candidates is not specifically limited if the number M is not more than the factorial of N, representing all combinations of the reproduction orders for the N sets of the contents. If, however, the number M of the recommended playlist candidates is 1, namely, if there is only one recommended playlist candidate, it is simply a matter of whether or not the recommended playlist candidate is accepted as a recommended playlist. Consequently, the number M of the recommended playlist candidates is assumed to be not less than 2 and not more than the factorial of N for the purpose of illustration hereinafter.

Specifically, if a round-robin method is used, all the conceivable sets, namely the factorial of N (equals M) sets of recommended playlist candidates are generated. If, on the other hand, a genetic algorithm, for example, is used, an appropriate number (M) of an initial group (first-generation), of recommended playlists are generated.

If a content is being played, the playlist candidate deciding section 31 can generate one recommended playlist candidate as follows. The playlist candidate deciding section 31 appends to a reproduction history (a list of each of one or more contents already played or being played in an actual order of reproduction) one or more of contents to be played, or target contents, in an appropriate order.

In the case the round-robin method is used, the recommended playlist creating section 15 lets the evaluating section 17 perform a following process and obtains a result of the process of the evaluating section 17.

The playlist candidate deciding section 31 supplies all the recommended playlist candidates to the evaluating section 17, one by one as described hereinafter.

Then the evaluating section 17 compares, for each of all the recommended playlist candidates, a distribution of frequency components of a prespecified feature quantity included in a reproduction period of all the N sets of contents reproduced-successively in the reproduction order corresponding to the recommended playlist candidate, with an ideal fluctuation. In case a plurality of feature quantities exist, details are described hereinafter, but essentially comparisons are further performed for each of the plurality of feature quantities.

The evaluating section 17 then performs evaluations on each of all the recommended playlist candidates with regards to the degree of fitness, or closeness to the ideal fluctuation, for the user, based on a comprehensive determination of the comparison results. For example, the evaluating section 17 computes a value for each of all the recommended playlist candidates indicating the degree of fitness as a recommended playlist candidate, hereinafter referred to as an evaluation value, and supplies the values to the recommended playlist creating section 15. The evaluation value is higher if the recommended playlist candidate is closer to the ideal fluctuation. Details of the evaluation value and a computation process thereof at the evaluating section 17 are described hereinafter in detail with reference to FIG. 2.

The recommended playlist selecting section 32 of the recommended playlist creating section 15 selects a playlist with the highest evaluation value as the recommended playlist, upon supply of the evaluation values for each of all the recommended playlist candidates from evaluating section 17.

The recommended playlist creating section 15 presents the recommended playlist to the user through the recommended playlist presenting section 16.

A recommended playlist presenting section 16 is set up, for example, as a display device and displays the recommended playlist as an image. Alternatively, the recommended playlist presenting section 16 may be set up as an audio output device, a speaker, for example, and outputs, or pronounces, the name, or the like, of each content included in the recommended playlist successively in the order identified with the recommended playlist.

If, on the other hand, the genetic algorithm is used, the recommended playlist creating section 15 regards recommended playlist candidates included in generation K (K is an integer not less than 1 and not more than a number indicating a penultimate generation), as all the recommended playlist candidates, lets the evaluating section 17 perform the sequence of processes as described hereinabove, and obtains evaluation values for each of the recommended playlist candidate included in the generation K.

Next, the playlist candidate deciding section 31 of the recommended playlist creating section 15 determines recommended playlist candidates to be included in generation K+1 based on each of the evaluation values obtained, then regards the recommended playlist candidates thus determined as all the recommended playlist candidates, lets the evaluating section 17 perform processes similar to those carried out for the generation K, and obtains evaluation values for each of the recommended playlist candidates included in the generation K+1.

The recommended playlist creating section 15 repeats the processes described hereinabove for each of the generations and builds the recommended playlist candidates. Finally, the recommended playlist selecting section 32 of the recommended playlist creating section 15 selects a recommended playlist candidate included in the last generation with the highest evaluation value as the recommended playlist.

As in the case the round-robin method is used, the recommended playlist is presented to the user through the recommended playlist presenting section 16.

In the example described hereinabove, only one recommended playlist is generated, namely only the recommended playlist candidate with the highest evaluation value is selected as the recommended playlist, but selection of two or more recommended playlists is not precluded. In this case, such methods can be used as selecting recommended playlist candidates with top T evaluation values (T is an integer not less than 1), or selecting recommended playlist candidates with evaluation values equal to or above a prespecified threshold value, as recommended playlists, for example.

The recommended playlist creating section 15 has thus been described hereinabove, with the recommended playlist presenting section 16 described in mid-flow.

Next, the evaluating section 17 is described in detail hereinafter. FIG. 2 shows a detailed functional configuration of the evaluating section 17 according to the embodiment of the present invention. The functional structure of the evaluating section 17 is described in detail with reference to FIG. 2.

The evaluating section 17 is set up, for example, as software, and includes a playlist acquiring section 33 through an evaluation value computing section 38.

From the recommended playlist creating section 15, or the recommended playlist candidate creating section 31, each of the recommended playlist candidate is supplied in sequence. The playlist acquiring section 33 obtains the recommended playlist candidates supplied from the recommended playlist creating section 15 one by one and supplies the same to the playlist feature quantity generating section 34.

A recommended playlist candidate obtained by the playlist acquiring section 33 is a noticeable playlist for the evaluating section 17 as a processing target and thus needs to be distinguished clearly from other playlists. Hence, the recommended playlist candidate obtained by the playlist acquiring section 33 is referred to hereinafter as a noticeable playlist.

The playlist feature quantity generating section 34, upon supply of a noticeable playlist from the playlist acquiring section 33, obtains information concerning time change in a level of a feature quantity for each of the N sets of contents included in the noticeable playlist, or feature quantity information for each of the N sets of contents, from the feature quantity storing section 13.

The playlist feature quantity generating section 34 next aligns each of the feature quantity information obtained for each of the N sets of contents in a row successively in a reproduction order of the noticeable playlist. Then the playlist feature quantity generating section 34 generates information combining the N sets of feature quantity information aligned in a row successively in the reproduction order.

In other words, N sets of waveforms indicated by the N sets of feature quantity information, or N sets of waveforms representing time changes in the level of feature quantity corresponding to the contents, are aligned on a time axis in the reproduction order described above, and information linking the waveforms into one is generated by the playlist feature quantity generating section 34.

Accordingly, the information generated by the playlist feature quantity generating section 34 can be described as having a waveform, as follows. The waveform indicated by the information is a waveform representing time changes in the level of a prespecified feature quantity within a reproduction period upon successive reproduction of each of the N sets of the contents in the noticeable playlist in the reproduction order of the noticeable playlist. Such successive reproduction is referred to as reproduction of the noticeable playlist hereinafter. The information generated by the playlist feature quantity generating section 34 is referred to hereinafter as playlist feature quantity information.

Further, in case a plurality of feature quantity types are used, playlist feature quantity is generated for each of the plurality of feature quantity types for the noticeable playlist.

The playlist feature quantity generating section 34 first sets up a prespecified feature quantity type from a plurality of feature quantity types as a feature quantity type to be noted, hereinafter referred to as a noticeable feature quantity type. Then the playlist feature quantity generating section 34 obtains from the feature quantity storing section 13 each of the N sets of feature quantity information for the noticeable feature quantity type from the plurality of sets of feature quantity information for each of the N sets of the contents included in the noticeable playlist. The playlist feature quantity generating section 34 further aligns the N sets of the feature quantity information for the noticeable feature quantity type successively in the reproduction order as described above, links them in one and thus generates a playlist feature quantity information set for the noticeable feature quantity type for the noticeable playlist.

Thereafter, the playlist feature quantity generating section 34 sets up each of unprocessed feature quantity types from the plurality of the feature quantity types as the noticeable feature quantity type in sequence, and performs a series of processes as described above in sequence. As a result, a playlist feature quantity information for the noticeable playlist is generated for each of the plurality of feature quantity types.

Specifically, as an example, a playlist 41 as shown in FIG. 3 is obtained by the playlist acquiring section 33 as the noticeable playlist and is supplied to the playlist feature quantity generating section 34.

FIG. 3 is an illustration of an example playlist. The playlist 41 in FIG. 3 has, as is shown on the drawing, contents 51 through 54 aligned in that order along the time line. A reproduction order of the playlist 41 in FIG. 3 is from the contents 51 through 54.

The numbers written in each of the contents 51 through 54, namely 254, 11, 229, and 582, respectively, represent a reproduction duration, in unit of second, for example, of each of the contents 51 through 54.

As described above, the content is assumed to be a music piece and the feature quantity types of the music piece are assumed to be tempo, mood and sound quantity, as described above. Accordingly, each of the contents 51 through 54 in FIG. 3 is also a music piece, and as feature quantity information for each of the contents 51 through 54, feature quantity information for each of tempo, mood and sound quantity is stored on the feature quantity storing section 13.

For example, as feature quantity information for tempo, one of the feature quantity types, for each of the contents 51 through 54, each of information for time series feature quantity in contents 61 through 64 is stored on the feature quantity storing section 13, as shown in FIG. 4.

In this case, the playlist feature quantity generating section 34 obtains each of the information for time series feature quantity in contents 61 through 64 from the feature quantity storing section 13. The playlist feature quantity generating section 34 then aligns each of the information for time series feature quantity in contents 61 through 64 successively in the order of the contents 51 through 54 as shown in FIG. 3 and FIG. 4, namely, in a reproduction order of the playlist 41. Then the playlist feature quantity generating section 34 generates a playlist feature information 71 of the noticeable playlist 41, as shown on FIG. 5, by linking the information for time series feature quantity in contents 61 through 64 in one.

Once the playlist feature quantity generating section 34 generates, as described above, the playlist feature information (the playlist feature information 71 in the embodiment), of the noticeable playlist (namely the playlist 41 on FIG. 3 in the embodiment), concerning the noticeable feature quantity type (tempo in the embodiment), the playlist feature quantity generating section 34 supplies the playlist feature information to a frequency analyzing section 35.

The frequency analyzing section 35, upon supply of the playlist feature information of the noticeable playlist concerning the noticeable feature quantity type, performs a frequency analysis of the playlist feature information. A result, information of the distribution of frequency components of a noticeable feature quantity included within the reproduction period of the noticeable playlist, is obtained and is supplied to the correlation degree computing section 36.

Such information as supplied from the frequency analyzing section 35 to the correlation degree computing section 36 is referred to as a frequency analysis result of the playlist hereinafter.

Methods for use in the frequency analysis are not particularly specified, and the Fast Fourier Transform (FFT), for example, may be used.

Figure 6:
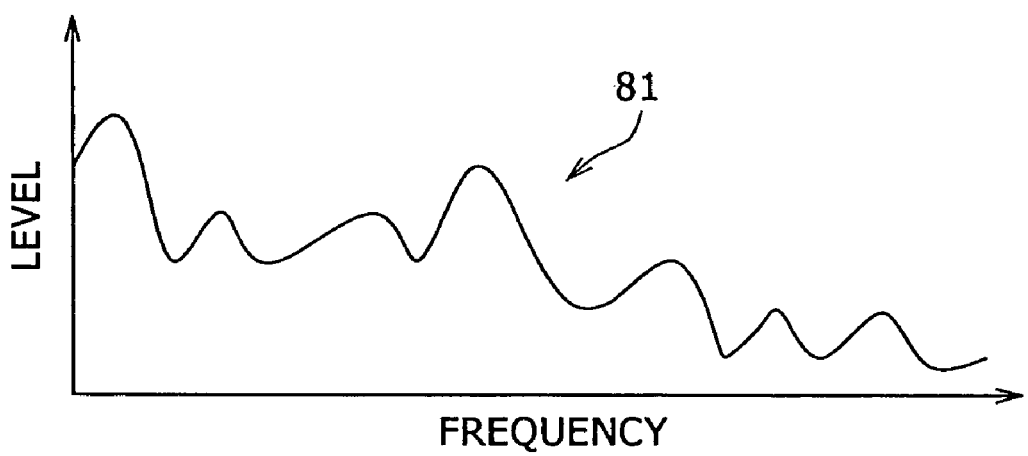
FIG. 6 is a diagram showing an example of a result of frequency analysis for a feature quantity in the playlist shown in FIG. 5.
Figure 7:
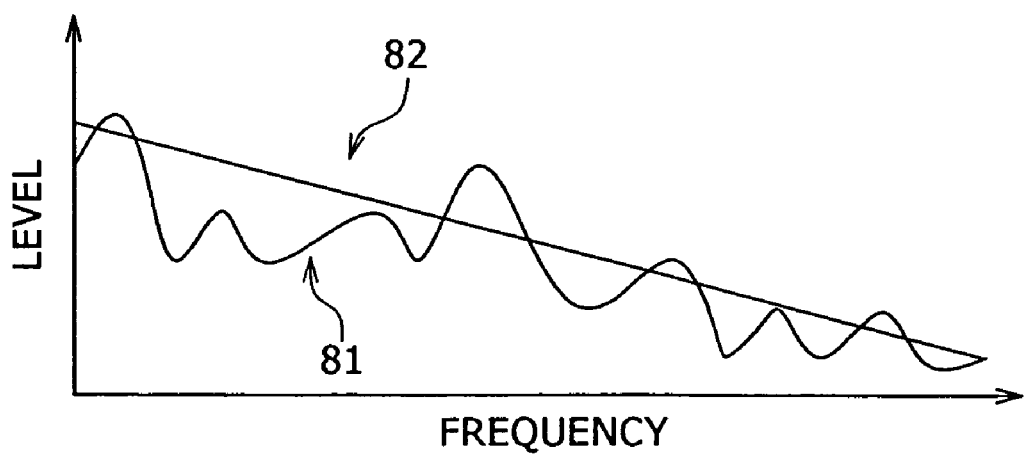
FIG. 7 is a diagram showing an example of comparison between a result of frequency analysis shown in FIG. 6 and ideal fluctuation.

Specifically, for example, when the playlist feature information 71 in FIG. 7 concerning tempo of the noticeable playlist 41 in FIG. 3 is frequency-analyzed, information 81 as shown in FIG. 6 is generated as a frequency analysis result of the playlist, and is supplied to the correlation degree computing section 36.

The correlation degree computing section 36 in FIG. 2, upon supply of the frequency analysis result of the noticeable playlist concerning the noticeable feature quantity type from the frequency analyzing section 35, obtains an ideal fluctuation concerning the noticeable feature quantity type (an ideal pattern of distribution of frequency components concerning the noticeable feature quantity type), from an ideal fluctuation storing section 22. The correlation degree computing section 36 then computes a degree of correlation between the frequency analysis result of the noticeable playlist concerning the noticeable feature quantity type and the ideal fluctuation concerning the noticeable feature quantity type. The correlation degree computing section 36 computes a value indicating a degree of closeness of the frequency analysis result of the noticeable playlist concerning the noticeable feature quantity type to the ideal fluctuation concerning the noticeable feature quantity type.

Specifically, for example, a curve 82, or a distribution pattern, shown in FIG. 7 is stored in the ideal fluctuation storing section 22 as an ideal fluctuation concerning tempo.

In this case, the correlation degree computing section 36 computes a correlation between the result of frequency analysis 81 for the noticeable playlist 41 concerning tempo and the ideal fluctuation 82 concerning tempo.

The degree of correlation between a frequency analysis result of a prespecified playlist concerning a prespecified feature quantity type and an ideal fluctuation concerning the prespecified feature quantity type is referred to as a degree of correlation between a prespecified playlist and an ideal fluctuation concerning a prespecified feature quantity type. Alternatively, the same is also referred to as a degree of correlation concerning a prespecified feature quantity type.

Thereafter the correlation degree computing section 36 stores the degree of correlation concerning the noticeable feature quantity type to a correlation degree storing section 37 and notifies the playlist feature quantity generating section 34 and the evaluation value computing section 38 about completion of processes concerning the noticeable feature quantity. That is, the correlation degree computing section 36 let the correlation degree storing section 37 store the degree of correlation concerning the noticeable feature quantity type. In the embodiment, completion of processes concerning tempo is notified to the playlist feature quantity generating section 34 and the evaluation value computing section 38.

The playlist feature quantity generating section 34 and the evaluation value computing section 38 recognize from the notice of the correlation degree computing section 36 that the feature quantity of the noticeable feature quantity type is now processed, and determine if there are feature quantity types not yet processed, or unprocessed feature quantity types.

If it is determined that there still are unprocessed feature quantity types, the playlist feature quantity generating section 34 newly sets up a prespecified feature quantity type from the unprocessed feature quantity types as the noticeable feature quantity type. The playlist feature quantity generating section 34 through the correlation degree computing section 36 thereafter perform the processes described above on the new noticeable feature quantity type. As a result, a degree of correlation concerning the new noticeable feature quantity type is stored on the correlation degree storing section 37. A degree of correlation between the frequency analysis result and the ideal fluctuation concerning the new noticeable feature quantity is stored on the correlation degree storing section 37.

If it is determined that there still are unprocessed feature quantity types, the evaluation value computing section 38 will stand by its processes.

Thereafter, each of the unprocessed feature quantity types is in turn set up as the new noticeable feature quantity type, and every time a new noticeable feature quantity type is set up, the playlist feature quantity generating section 34 through the correlation degree computing section 36 perform the series of processes as described above. As a result, finally, degrees of correlation concerning each of the all feature quantity types, namely, degrees of correlation between the noticeable playlist and the ideal fluctuation for each of all the feature quantity types, are stored on the correlation degree storing section 37.

For example, in the embodiment, in addition to the degree of correlation concerning to tempo, a degree of correlation concerning mood and a degree of correlation concerning sound quantity are stored on the correlation degree storing section 37.

As a result of the processes described above, the playlist feature quantity generating section 34 and the evaluation value computing section 38 determine that there are no more unprocessed feature quantity types, that is, all the feature quantity types are processed, and the playlist feature quantity generating section 34 ends its processes while the evaluation value computing section 38 starts the following processes.

The evaluation value computing section 38 obtains each of all the degrees of correlation concerning all the feature quantity types stored in the correlation degree storing section 37. Based on the degrees of correlation, or based on a comprehensive determination, the section 38 determines an evaluation value of the noticeable playlist, and supplies the same to the recommended playlist creating section 15. As described above, the higher the evaluation value of the noticeable playlist is, the higher the probability of the noticeable playlist is to be selected as a recommended playlist.

The ideal fluctuation storing section 22 may also store a value designating importance of each of the feature quantity types, hereinafter referred to as a weighting factor, and details thereof is described hereinafter.

In this case, the evaluation value computing section 38 obtains all the weighting factors for all the feature quantity types from the ideal fluctuation storing section 22 in addition to each of all the degrees of correlation concerning all the feature quantity types from the correlation degree storing section 37, and can determine an evaluation value of the noticeable playlist based on a comprehensive determination of the degrees of correlation and the weighting factors.

Specifically, for example, there are n sets of feature quantity types (n is an integer not less than 1), and each of the feature quantity types is given a number between 1 and n. The degree of correlation concerning feature quantity type k. (k is an integer between 1 and n) is written as Ck, and the weighting factor for the feature quantity type k as Wk. The larger the degree of correlation Ck is, the higher the degree of correlation is (or the closer the feature quantity information is). The larger the weighting factor Wk is, the more important the feature quantity type is.

In this case, if the evaluation value of the noticeable playlist is expressed as score, the evaluation value computing section 38 can determine an evaluation value of the noticeable playlist score by solving formula 1 hereinafter.

$$\sum_{i=1}^{n} Ci \times Wi$$ Formula 1

Specifically, for example, in the embodiment, numbers 1 through 3 are assigned to tempo, mood and sound quantity. In this case, degrees of correlation for tempo, mood and sound quantity are expressed as C1, C2 and C3, respectively. Weighting factors for tempo, mood and sound quantity are expressed as W1, W2 and W3, respectively. Accordingly, the evaluation value of the noticeable playlist in the embodiment is expressed in Formula 2.

score=$C1 \times W1 + C2 \times W2 + C3 \times W3$  Formula 2:

The evaluation value of the noticeable playlist score computed by the evaluation value computing section 38 is supplied to the recommended playlist creating section 15 in FIG. 1.

Thereafter, the playlist candidate deciding section 31 of the recommended playlist creating section 15 sets up each of the remaining recommended playlist candidates as the noticeable playlist one by one, and supplies the same to the evaluating section 17. The evaluating section 17 performs the series of processes described above in each case and supplies the evaluation value score for the recommended playlist candidate set up as the noticeable playlist to the recommended playlist creating section 15 successively.

Accordingly, the recommended playlist creating section 15 ultimately obtains an evaluation value score for each of all the recommended playlist candidates.

The recommended playlist selecting section 32 of the recommended playlist creating section 15 then selects recommended playlist candidates with top T evaluation values score (T is an integer not les than 1) or with the evaluation values score equal to or larger than a prespecified threshold value.

If, for example, the genetic algorithm is used, then based on the recommended playlist candidates selected from all the recommended playlist candidates included in the generation K, all the recommended playlist candidates included in the generation K+1 are determined by the playlist candidate deciding section 31, and the series of processes described above are performed with regards to the generation K+1. All the evaluation values score for all the recommended playlist candidates included in the generation K+1 are computed by the evaluating section 17, and several recommended playlist candidates are selected by the recommended playlist selecting section 32 based on the evaluation score for all the recommended playlist candidate included in the generation K+1.

The series of processes described above are performed on each of the generations, and when evaluation values score of all the recommended playlist candidates included in the final generation are computed by the evaluating section 17 ultimately, several recommended playlist candidates are selected by the recommended playlist selecting section 32 based on the evaluation values score of all the recommended playlist candidates included in the final generation. The recommended playlist candidates selected at this stage are presented to the user as the recommended playlists through the recommended playlist presenting section 16.

If, for example, the round-robin method is used, the recommended playlist candidates initially selected by the recommended playlist selecting section 32 are determined, without any further processes, to be the recommended playlists, and are presented to the user as the recommended playlists through the recommended playlist presenting section 16.

The structures and functions of each of the contents storing section 11 through the evaluating section 17 on FIG. 1 are described hereinabove individually. Structures and functions of each of remaining sections, a contents reproducing section 18 through an ideal fluctuation storing section 22, are described hereinafter individually.

A contents reproducing section 18 is set up, for example, as a combination of software and output equipment, or hardware, for the content. In the embodiment, the content is a music piece, hence the contents reproducing section 18 is set up with a combination of an application software with functions to reproduce music and audio output devices such as a speaker or a headphone output terminal.

The contents reproducing section 18, upon supply of a manual reproduction command from the operating section 14, obtains the content from the contents storing section 11 and reproduces a content designated in the manual reproduction instruction, namely a content specified by the user.

The contents reproducing section 18, upon supply of a list reproduction command from the operating section 14, retrieves a corresponding recommended playlist from the recommended playlist creating section 15 and reproduces the playlist.

More specifically, the contents reproducing section 18 retrieves a content designated as first to be reproduced in the recommended playlist from the contents storing section 11 and reproduces the content. When the reproduction of the content is completed, the contents reproducing section 18 retrieves a content designated as second to be reproduced in the recommended playlist from the contents storing section 11 and reproduces the content. The contents reproducing section 18 thereafter repeats the processes described above, and each of the contents designated as third through last to be reproduced in the recommended playlist is retrieved sequentially from the contents storing section 11 in that order and reproduced sequentially.

For example, in the embodiment, the recommended playlist is a list with one or more music pieces aligned in the reproduction order, and the contents storing section 11 stores one or more music piece, or audio data, included in the recommended playlist. Accordingly, each of the music pieces included in the recommended playlist is retrieved from the contents storing section 11 out of all the music pieces on the contents storing section 11 in the reproduction order specified in the recommended playlist, and each of the retrieved music pieces is outputted through the contents reproducing section 18 sequentially.

The contents reproducing section 18, upon supply of a list reproduction command for a new recommended playlist during reproduction of a certain music piece, can reproduce the new recommended playlist, or reproduce each of contents included in the new recommended playlist, in a specified reproduction order sequentially, once the ongoing reproduction of the music piece is completed.

When reproduction of a recommended playlist by the contents reproducing section 18 is completed, the user can input a user evaluation on the recommended playlist to a reproduction history acquiring section 19 through operations on the operating section 14. The user evaluation is different from the evaluation value score in Formula 1 above, namely an evaluation given by the evaluating section 17 in FIG. 1, but is an objective evaluation given by the user. Accordingly, the user can input to the reproduction history acquiring section 19 the user's impression and the like after actually viewing and listening to the reproduction of the recommended playlist, namely a series of successive reproductions of each of the contents in the specified reproduction order, as the user evaluation of the recommended playlist, through operations on the operating section 14.

The reproduction history acquiring section 19 is set up, for example, as software, generates information associating the user evaluation supplied from the operating section 14 with the recommended playlist that the user evaluation is performed on, and stores the information to a reproduction tracking data storing section 20 as reproduction tracking information.

The reproduction tracking data storing section 20 is set up, for example, as an area on a hard disk, and stores one or more sets of reproduction tracking information.

The ideal fluctuation computing section 21 is set up, for example, as software, and, as new reproduction tracking information is stored in the reproduction tracking data storing section 20, updates the ideal fluctuation and weighting factor for each of the feature quantity types stored in an ideal fluctuation storing section 22.

The ideal fluctuation storing section 22 is set up, for example, as an area on a hard disk, and stores an ideal fluctuation and a weighting factor for each of the feature quantity types. Specifically, in the embodiment, the content is a music piece, and as feature quantity types, tempo, mood and sound quantity are used. Therefore, an ideal fluctuation for each of tempo, mood and sound quantity, and a weighting factor for each of tempo, mood and sound quantity is stored.

The ideal fluctuation computing section 21 and the ideal fluctuation storing section 22 are described in more detail hereinafter.

For example, the ideal fluctuation storing section 22 assumedly stores two or more ideal fluctuation candidates concerning a prespecified feature quantity type, tempo, for example.

Kinds of ideal fluctuation candidates are not specifically specified. As described hereinafter, however, an ideal fluctuation is selected, or updated, from the ideal fluctuation candidates based on reproduction tracking information. Accordingly, it is advisable to choose such types of ideal fluctuations as generally regarded as ideal for a plurality of users, or ideal for an average user. The number of ideal fluctuation candidates is not particularly specified, either.

Specifically, as an example, the ideal fluctuation storing section 22 stores the following ideal fluctuations (A) through (C) as ideal fluctuation candidates concerning a prespecified feature quantity, tempo, for example.

(A) $1/f$ fluctuation
(B) $1/f^{1.5}$ fluctuation
(C) $1/f^2$ fluctuation

The "(A) $1/f$ fluctuation" is information indicating a distribution pattern with a distribution of frequency components of a feature quantity equal to $1/f$. Similarly, the "(B) $1/f^{1.5}$ fluctuation" is information indicating a distribution pattern with a distribution of frequency components of a feature quantity equal to $1/f^{1.5}$. Likewise, the "(C) $1/f^2$ fluctuation" is information indicating a distribution pattern with a distribution of frequency components of a feature quantity equal to $1/f^2$.

An updatable evaluation value is given for each of the ideal fluctuation candidates concerning a prespecified type of feature quantity, tempo, for example. Specifically, in the embodiment, for each of "(A) $1/f$ fluctuation", "(B) $1/f^{1.5}$ fluctuation" and "(C) $1/f^2$ fluctuation", values 0.4, 0.5 and 0.6 are assigned as evaluation values.

An ideal fluctuation candidate with a highest evaluation value is assumedly selected as an ideal fluctuation, namely used in the evaluating section 17, at a time. As an ideal fluctuation concerning a prespecified type of feature content, tempo, for example, an ideal fluctuation candidate with the highest evaluation value is selected from among the ideal fluctuation candidates for the prespecified type of feature content. Specifically, for example, "(C) $1/f^2$ fluctuation" is used as the ideal fluctuation in the embodiment.

An ideal fluctuation for a prespecified type of feature quantity is described hereinabove, but for other types of feature quantities, a plurality of ideal fluctuation candidates are stored on the ideal fluctuation storing section 22 with evaluation values attached thereto, respectively, and for each type of feature quantities, an ideal fluctuation candidate with a highest evaluation value is selected as an ideal fluctuation for the corresponding type.

The ideal fluctuation computing section 21, when new reproduction tracking information is stored on reproduction tracking data storing section 20, updates the evaluation values of each of the ideal fluctuation candidates for each of the types of the feature quantities stored in the ideal fluctuation storing section 22 based on the new reproduction tracking information. Consequently, ideal fluctuation candidates with highest evaluation values after update of each of the ideal fluctuation candidates for each type of the feature quantities are newly used (updated) as ideal fluctuations for the corresponding feature quantities respectively.

More specifically, the ideal fluctuation computing section 21, when new reproduction tracking information is stored on the reproduction tracking data storing section 20, for each type of the feature quantities, selects an ideal fluctuation candidate with a highest correlation with (closest to) a frequency analysis result of the recommended playlist from among a plurality of the ideal fluctuation candidates included in the new reproduction tracking information. With regards to the frequency analysis result of the recommended playlist included in the information, the ideal fluctuation computing section 21 may by itself newly compute and use a result thereof, or may use a result previously computed by the evaluating section 17.

Next, the ideal fluctuation computing section 21 updates the evaluation values of the selected ideal fluctuation candidates, one for each type of the feature quantities, based on the user evaluation included in the new reproduction tracking information.

More specifically, for example, there are assumedly three types of user evaluations, namely, "good", "average" and "poor". The evaluation value before update of the ideal fluctuation candidate selected from a plurality of the ideal fluctuation candidates, or an update target, for a prespecified type of the feature quantities is assumedly p (p is a prespecified integer).

If, for example, the user evaluation is "good", then the ideal fluctuation computing section 21 updates the evaluation value of the update target from p to p+q (q is a prespecified integer).

If, for example, the user evaluation is "poor", then the ideal fluctuation computing section 21 updates the evaluation value of the update target from p to p−r (r is a prespecified integer including q).

If the user evaluation is "average", then the ideal fluctuation computing section 21 does not update the evaluation value of the update target, or in other words, updates the evaluation value of the update target from p to p+0.

More specifically, for example, the ideal fluctuation computing section 21, in a way similar to the evaluating section 17, assumedly selects a prespecified type of feature quantity from among a plurality of the types of the feature quantities as a noticeable feature quantity. An ideal fluctuation candidate concerning the noticeable feature quantity with a highest correlation with the frequency analysis result of the recommended playlist included in the new reproduction tracking information is assumedly "(A) 1/f fluctuation". The user evaluation is assumedly "good".

The evaluation value of "(A) 1/f fluctuation" is accordingly updated from 0.4 to 0.4+q as described hereinabove.

Consequently, if q is not less than 0.3, the updated evaluation value 0.4+q of "(A) 1/f fluctuation" is not less than 0.7, a highest value, and from next time (until a next update), "(A) 1/f fluctuation" is selected as the ideal fluctuation concerning the noticeable feature quantity. The ideal fluctuation concerning the noticeable feature quantity has been updated from "(C) $1/f^2$ fluctuation" to "(A) 1/f fluctuation".

In the example described above, only the ideal fluctuation candidate with the highest correlation with the frequency analysis result of the recommended playlist included in the new reproduction tracking data is selected as the update target and only one evaluation value thus selected is updated, but the evaluation values for the other unselected ideal fluctuation candidates may also be updated.

More specifically, for example, if the user evaluation is "good", then only the evaluation value of "(A) 1/f fluctuation" is updated from 0.4 to 0.4+q in the example described above, but in the example being described, the evaluation value of "(B) $1/f^{1.5}$ fluctuation" may be further updated from 0.5 as described above to 0.5−s (s is a prespecified integer including q) and the evaluation value of "(C) $1/f^2$ fluctuation" from 0.6 as described above to 0.6−s.

Similarly, if the user evaluation is "poor", for example, then only the evaluation value of "(A) 1/f fluctuation" is updated from 0.4 to 0.4−r in the example described above, but in the example being described, the evaluation value of "(B) $1/f^{1.5}$ fluctuation" may be further updated from 0.5 as described above to 0.5+t (t is an arbitrary integer including r) and the evaluation value of "(C) $1/f^2$ fluctuation" from 0.6 as described above to 0.6+t.

If the user evaluation is "average", then all updates on the evaluation values for "(A) 1/f fluctuation", "(B) $1/f^{1.5}$ fluctuation" and "(C) $1/f^2$ fluctuation" may be precluded.

Thereafter, each of unprocessed types of the feature quantities is sequentially set as a new noticeable feature quantity one by one, and each time a new noticeable feature quantity is set, the series of processes (updating process of evaluation values for the ideal fluctuation candidates) described hereinabove are executed on the new noticeable feature quantity.

Finally, the evaluation values of the ideal fluctuation candidates for all types of the feature quantities are updated, respectively, and consequently the ideal fluctuation for all types of the feature quantities are updated, respectively (including cases of updates to the same ideal fluctuations or preclusion of updates).

As described above, the ideal fluctuation is updated based on the reproduction history information for the user using the content reproducing device shown in FIG. 1. Accordingly, although initially an ideal fluctuation to be considered as to appropriate for a plurality of users or for an average user may be used in the evaluating section 17, the ideal fluctuation used in the evaluating section 17 will gradually become closer to the ideal or preference of the user as the user performs user evaluations using the recommended playlist. Consequently, recommended playlists to be decided (created) based on an evaluation of the evaluating section 17 become closer to the ideal list for the user.

A method of updating an ideal fluctuation is thus explained hereinabove. A method of updating a weighting factor is explained hereinafter.

As a basic policy for updating a weighting factor, a following policy, for example, may be adopted. Namely, if an ideal fluctuation candidate selected, or adopted, as an ideal fluctuation for a noticeable feature quantity has an evaluation value, (after update of an evaluation value) stands out in comparison with evaluation values for other ideal fluctuation candidates, namely, a preference of the user for the selected ideal fluctuation candidate is clearly identified, then a weighting factor for the noticeable feature quantity is updated in the direction of increase, and otherwise, the weighting factor for the noticeable feature quantity is updated in the direction of decrease.

According to such a basic policy, by updating the weighting factor for the noticeable feature quantity in the ideal fluctuation computing section 21, following effects can be realized.

Namely, if the user is sensitive to a playlist feature quantity for a certain type of feature quantity or tempo, or the like among playlist feature quantities of the recommended playlist (time change in a level of feature quantity within a reproduction period of the recommended playlist), then the user's preference or a preference for ideal fluctuation, for the type of feature quantity or tempo or the like is clearly visible. In other words, an evaluation value for the ideal fluctuation candidate selected as the ideal fluctuation is substantially larger than evaluation values for the other ideal fluctuation candidates. In this case, by increasing a weighting factor for the type of feature quantity, a recommended result (presenting a new recommended playlist) tends to more accurately reflect the user's preference.

Conversely, if the user is insensitive, then the user's preference or a preference for ideal fluctuation for the type of feature quantity is not clearly visible. In other words, an evaluation value for the ideal fluctuation candidate selected as the ideal fluctuation is different from evaluation values for the other ideal fluctuation candidates. In this case, by decreasing a weighting factor for the type of feature quantity, a recommended result tends not to reflect the user's preference.

Accordingly, to the extent a method of update for a weighting factor is based on the basic policy as described above, such effects are realized, and any such a method of updating may be adopted.

Specifically, for example, a method of updating as described hereinafter may be adopted as a method of updating a weighting factor based on the basic policy as described above.

Namely, for each type of the feature quantities, a difference value between maximum and minimum evaluation values from among evaluation values of a plurality of ideal fluctuation candidates for the type of the feature quantity is adopted as a weighting factor. Namely, each time evaluation values of a plurality of the ideal fluctuation candidates are updated, respectively, a difference value between maximum and minimum evaluation values from among the updated evaluation values is adopted (updated) as a new weighting factor.

More specifically, for example, there exist as ideal fluctuation candidates for a certain type of feature quantity "(A) 1/f fluctuation", "(B) $1/f^{1.5}$ fluctuation" and "(C) $1/f^2$ fluctuation" as described hereinabove, as each an evaluation value of 1.0, 0.0 and 0.0 assigned respectively. Namely, the evaluation value before update for "(A) 1/f fluctuation" is 1.0, the evaluation value before update for "(B) $1/f^{1.5}$ fluctuation" is 0.0 and the evaluation value before update for "(C) $1/f^2$ fluctuation" is 0.0.

A weighting factor for the type of the feature quantity is calculated as the maximum evaluation value (1.0)–the minimum evaluation value (0.0)=1.0. Namely, the pre-update weighting factor for the type of the feature quantity is 1.0.

Thereafter, for example, the evaluation values for "(A) 1/f fluctuation", "(B) $1/f^{1.5}$ fluctuation" and "(C) $1/f^2$ fluctuation" are assumed to update to 0.3, 0.4 and 0.3, respectively. Namely the evaluation value for "(A) 1/f fluctuation" is 0.3 after update, the evaluation value for "(B) $1/f^{1.5}$ fluctuation" is 0.4 after update and the evaluation value for "(C) $1/f^2$ fluctuation" is 0.3 after update.

In this case, the weighting factor for the type of the feature quantity is updated to the maximum evaluation value (0.4)–the minimum evaluation value (0.3)=0.1. Namely the weighting factor after update for the type of feature quantity becomes 0.1.

Although specific examples are omitted, other weighting factors for other types of feature quantities are also updated in the similar manner.

The functional configuration of the content reproducing device according to the present invention had been explained with reference to FIGS. 1 to 7.

The contents storing section 11 through the ideal fluctuation storing section 22 included in the content reproducing device shown in FIG. 1 may be made up of software, hardware or a combination thereof, within a feasible range and not limited to the examples described above.

The contents storing section 11 through the ideal fluctuation storing section 22 are included in a single content reproducing device in the examples described above, but may be included in a plurality of information processing apparatuses in portion. In this case, which of the contents storing section 11 through the ideal fluctuation storing section 22 is included in which information processing apparatus is not specified.

Of the processes a content reproducing device performs having a functional configuration described above, a series of processes from to presenting generating a recommended playlist, hereinafter referred to as a recommended playlist creating process, is described as an example with reference to FIG. 8.

A trigger for starting the recommended playlist generating process may be, in addition to a creation command from the operating section 14, a signal generated by the content reproducing device per se, a signal generated autonomously at a prespecified interval, for example.

Figure 8:
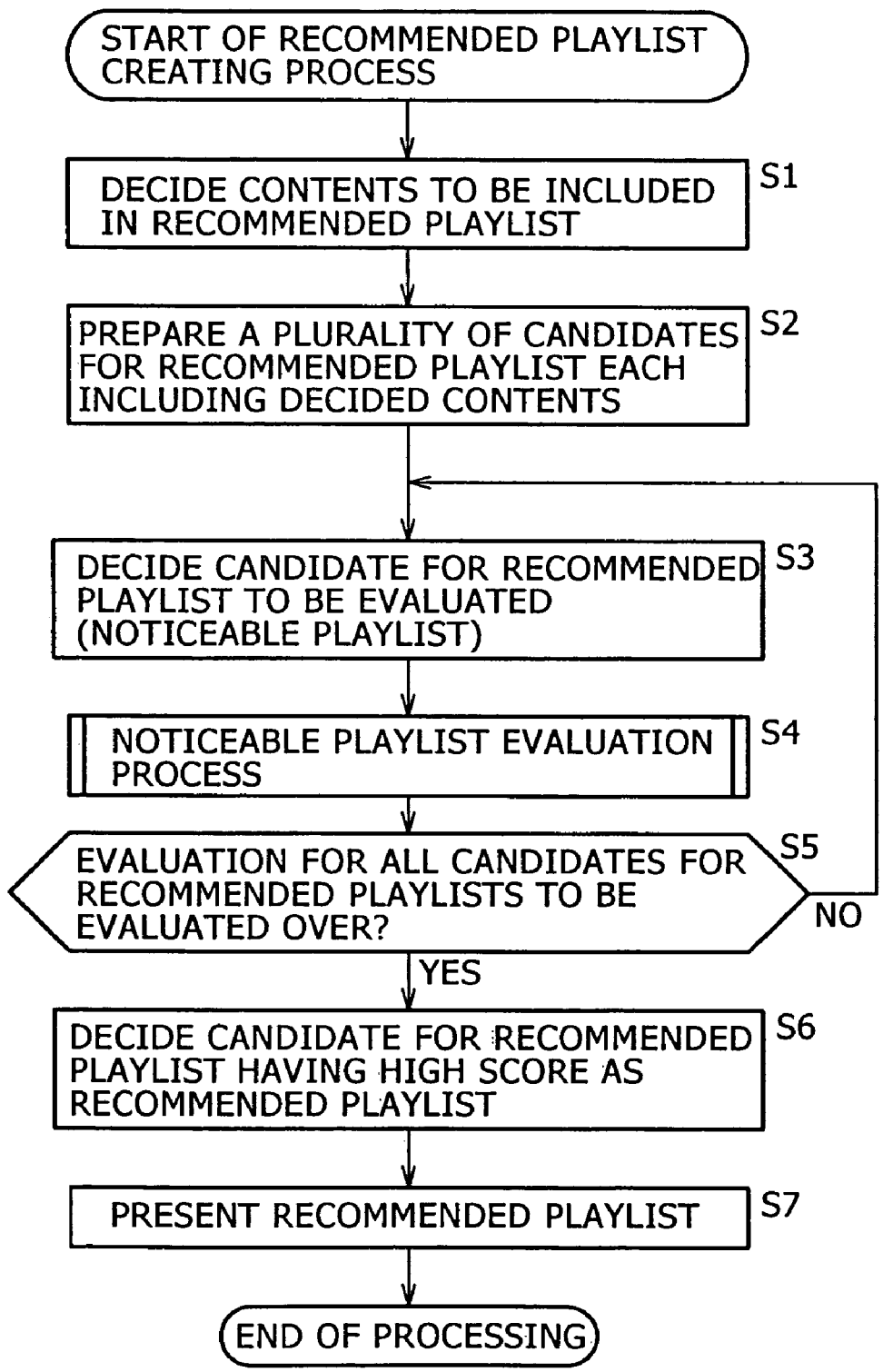
FIG. 8 is a flowchart showing a process of generating a recommended playlist in the content reproducing device shown in FIG. 1.

When a recommended playlist creating process starts shown in FIG. 8, a recommended playlist candidate deciding section 31 of a recommended playlist creating section 15 determines contents to be included in the recommended playlist in Step S1. Namely, N sets of contents are decided as reproduction targets from the contents stored in the contents storing section 11 in the process of Step S1.

In Step S2, the recommended playlist candidate deciding section 31 generates a plurality of sets, or M sets, of recommended playlist candidates including the contents decided in the process of Step S1. Namely, M sets of playlists are generated as recommended playlist candidates with differing reproduction orders from each other in the process of Step S2. The number of the generated recommended playlist candidates, or M, is not particularly specified. If, for example, a round-robin method is used, then the number is all the combinations of the reproduction orders, or a factorial of N, while if a genetic algorithm is used, then the number is a number of the playlist candidates to be included in the first generation.

In Step S3, the recommended playlist candidate deciding section 31 decides a playlist to be evaluated, namely, a noticeable playlist.

If, for example, a round-robin method is used, a noticeable playlist is decided from among the M sets of the recommended playlist candidates generated in the process of Step S2.

On the other hand, when the genetic algorithm is used, a noticeable playlist is decided from M sets of candidate playlists generated in step S2 for the first generation. For the subsequent generation, at the point of time when processing for the k-th generation is terminated, namely in step S3, candidate playlists included in the (K+1)th generation are decided for the second and subsequent generations, and in the each process step S3 for the (K+1)th generation, a noticeable playlist is decided from among the recommended candidate playlists decided in the first step S3 and included in the (K+1)th generation.

When the decided noticeable playlist is supplied to the evaluating section 17, the process proceeds to step S4.

In step S4, the evaluating section 17 executes the processing for computing an evaluation value (for instance, an evaluation value (Score) as a result of computing through the equation (1) above) for the supplied noticeable playlist (described as noticeable playlist evaluating process hereinafter). Details of the noticeable playlist evaluating process are described with reference to the flowchart shown in FIG. 9.

When an evaluation value for the noticeable playlist is supplied from the evaluating section 17 to the recommended playlist creating section 15 as a result of the noticeable playlist evaluating process in step S4, the process goes on to step S5.

In step S5, the recommended candidate deciding section 31 in the recommended playlist creating section 15 determines whether an evaluation has been made for all of the recommended candidate playlist to be evaluated or not.

When it is determined that the evaluation for all the recommended candidate playlists has not been finished, the process is returned to step S3, and the processes in step S3 and on are repeated. Namely of the recommended candidate playlists to be evaluated, those not having been evaluated are sequentially decided each as a noticeable playlist, and an evaluation value for each of the recommended candidate playlists is computed in the noticeable playlist evaluating process in step S4.

Then, when the round-robin system is employed, it is determined in step S5 that all the recommended candidate playlists to be evaluated have been actually evaluated at the point of time when evaluation values for all the recommended candidates playlists are supplied to the recommended playlist creating section 15.

On the other hand, when the genetic algorithm is employed, for the generations prior to the last generation, even when evaluation values of all the recommended candidate playlists included in the corresponding generations are supplied from the evaluating section 17 to the playlist generating section 15, it is determined in step S5 that all the recommended playlists to be evaluated have not been evaluated with the process returned to step S3, and the processes in step S3 and on are repeated. Namely, in the process in step S3, the recommended candidate playlists included in the next generation are decided based on evaluation values of the candidate playlists in the generations so far, and then the candidate playlists are sequentially decided each as a noticeable playlist one by one, and the processes in step S3 and on are repeated.

Finally, at the point of time when evaluation values for all recommended candidate playlists included in the final generation are supplied from the evaluating section 17 to the recommended playlist creating section 15, it is determined in step S5 that all of the recommended candidate playlists to be evaluated have been evaluated.

As described above, when it is determined in step S5 that all of the recommended candidate playlists to be evaluated have been evaluated, the process goes to step S6.

In step S6, the playlist selecting section 32 in the recommended playlist creating section 15 decides (selects) the recommended candidate playlists each having a high evaluation value (generally a recommended candidate playlist having the highest evaluation value) as described above as a recommended playlist. The decided recommended playlist is supplied to the recommended playlist presenting section 16.

Then in step S7, the recommended playlist presenting section 16 presents the recommended playlist to a user.

With this operation, the recommended playlist creating process is terminated.

Next, an example of the playlist evaluating process in step S4 is described with reference to FIG. 9.

Figure 9:
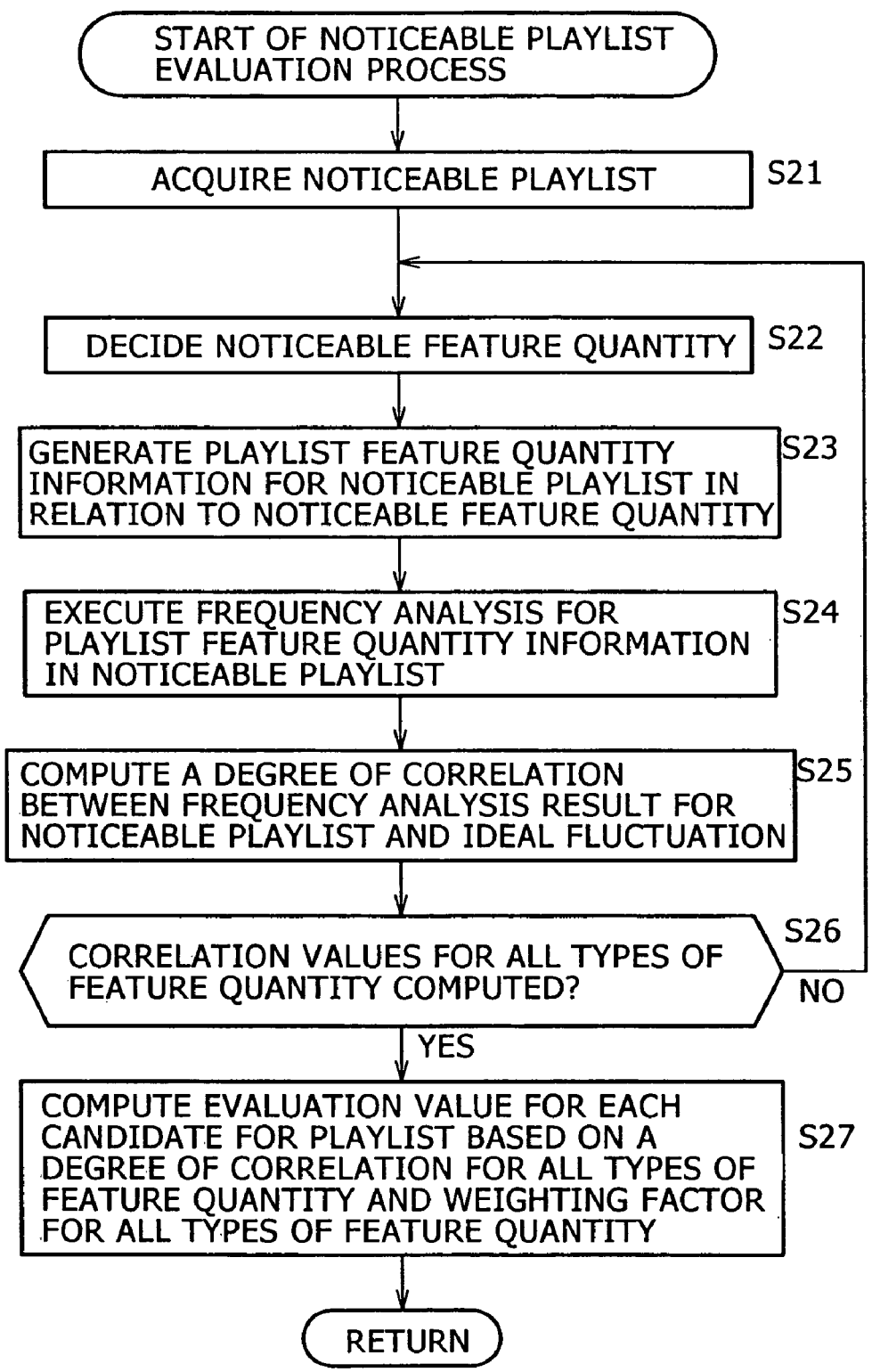
FIG. 9 is a flowchart illustrating in detail an example of a playlist evaluation process shown in FIG. 8.

As described above, when a noticeable playlist is decided in step S3 shown in FIG. 8 and the noticeable playlist is supplied from the recommended playlist creating section 15 to the evaluating section 17, the playlist evaluating process shown in FIG. 9 is started.

In step S21, the playlist acquiring section 33 in the evaluating section 17 shown in FIG. 2 acquires the noticeable playlist and supplied the noticeable playlist to the playlist feature quantity generating section 34.

In step S22, the playlist feature quantity generating section 34 decides a noticeable feature quantity. Therefore, in steps S23 to S25, a processing for the noticeable feature quantity is executed. It is to be noted that, in the following descriptions for the steps S23 to S25, the expression of "for the noticeable feature quantity" is omitted.

In step S23, the playlist feature quantity generating section 34 generates playlist feature quantity information for the noticeable playlist. Namely, the acquired sets of feature quantity information are arrayed according to the reproduction order of the noticeable playlist, and the sets are linked to one combined set to generate the playlist feature quantity information for the noticeable playlist.

When playlist feature quantity information for the noticeable playlist generated by the playlist feature quantity generating section 34 in step S23 is supplied to the frequency analyzing section 35, the process goes to step S24.

In step S24, the frequency analyzing section 35 executes frequency analysis for the playlist feature quantity information for the noticeable playlist supplied thereto.

A result of the processing in step S24, namely a result of frequency analysis for the noticeable playlist is supplied from the frequency analyzing section 35 to the correlation degree computing section 36, the process goes to step S25.

In step S25, the correlation degree computing section 36 computes a degree of correlation between a result of frequency analysis for the noticeable playlist and ideal fluctuation.

More specifically, to describe in contrast to the example described above, a playlist 41 shown in FIG. 3 is set as a noticeable playlist in step S21. A prespecified type of feature quantity such as a tempo is decided as a noticeable feature quantity in step S22, and various types of processing required for computing a degree of correlation for the noticeable feature quantity are executed in step S23 to step S25. Namely, in step S23, as shown in FIG. 4, feature quantity information 61 to feature quantity information 64 for the contents 51 to contents 54 included in the noticeable playlist 41 are arrayed in the order (in the reproduction order), and the feature quantity information 61 to feature quantity information 64 are combined into one set of information, thus the playlist feature quantity information 71 as shown in FIG. 5 is generated. Then the process in step S24 is executed, and a frequency analysis result 81 for the playlist feature quantity information 71 in the noticeable playlist 41 as shown in FIG. 6 is obtained. Then a degree of correlation between the frequency analysis result 81 and ideal fluctuation 82 is computed as shown in FIG. 7.

A result of processing in step S25 as described above, namely a degree of correlation for the noticeable feature quantity is stored in the storing section 37, and when termination of the processing for the noticeable feature quantity is notified to the playlist feature quantity generating section 34 as well as to the evaluation value computing section 38, the process goes on to step S26.

In step S26, the playlist feature quantity generating section 34 and the evaluation value computing section 38 determine whether a degree of correlation has been computed from all types of feature quantity or not.

When it is determined in step S26 that a degree of correlation has not been computed from all types of feature quantity, the process is returned to step S22, and the processes in step S22 and on are repeated. Namely, feature quantities each with the correlation degree not having been computed are sequentially decided as new noticeable feature quantities, and a degree of correlation for each of the new noticeable feature quantities is computed sequentially.

The evaluation value computing section 38 is kept in the stand-by state during the process above.

When a degree of correlation is computed for all types of feature quantities and the computed values are stored in the correlation value storing section 37 with the fact notified to the playlist feature quantity generating section 34 as well as the evaluation value computing section 38, it is determined in step S26 that a degree of correlation has been computed for all types of feature quantities, and the process goes to step S27.

Then the playlist feature quantity generating section 34 terminates the processing, and then the evaluation value computing section 38 executes the process in step S27.

Namely, in step S27, the evaluation value computing section 38 computes an evaluation value for a noticeable playlist based on degrees of correlation for all types of feature quantities as well as on weighting factors for all types of the feature quantities. More specifically, for instance, the process in this step S27 is equivalent to computing through the equation (1).

Then, when an evaluation value for the noticeable playlist is supplied from the evaluating section 17 shown in FIG. 1 to the recommended playlist creating section 15, the noticeable playlist evaluating process is finished. Namely, the recommended playlist creating section 15 starts the processing in step S5 shown in FIG. 8.

Of the processes executed by the content reproducing device having the functional configuration as shown in FIG. 1, a process for generating a recommended playlist was described with reference to FIG. 8 above, and then a detailed example of the noticeable playlist evaluating process in the recommended playlist creating process was described.

When the user utilizes the content reproducing device as described above (described as an information processing apparatus according to the present invention to differentiate it from that based on the conventional technology), the first to third advantages as described below are obtained.

A first advantage is an advantage that a change pattern of a feature quantity for each of the content during the playlist reproduction process is not required to be previously decided in the playlist creating process. Namely, the first advantage is an advantage capable of solving the first problem in the conventional technology described above.

Because, as described above, in the information processing apparatus of the present invention, parameters required to be previously given are only an ideal fluctuation and a weighting factor for each of the types of feature quantities. Namely, by making use of the ideal fluctuation and weighting factor for each of the types of feature quantities, change patterns for various feature quantities substantially similar to the ideal fluctuation may automatically be generated.

A second advantage is an advantage capable of creating a recommended playlist with the past reproduction flow incorporated therein, when the content reproduction is carried out without using the new playlist creating function (of the present invention) as described above, by making use of the new playlist creating function. Namely, the second advantage is an advantage capable of solving the second problem in the conventional technology as described above.

Because, this new playlist creating function mounted on the information processing apparatus of the present invention is a function of creating a recommended playlist in which a music (a content) to be reproduced is added to the end of the past reproduction history while at the same time evaluating the recommended playlist. Namely, a recommended playlist generated by the function is a playlist optimal for a user when an additional music is reproduced following the music which has been reproduced before now.

A third advantage is an advantage capable of creating a playlist in which reproduction may be infinitely continues with no collapse in the contents array, in other words, an advantage not to require to previously decide a length of a playlist for creating the playlist. Namely, the third advantage is an advantage capable of solving the third problem in the conventional technology as described above.

Because generation of a "recommended playlist with a past reproduction flow incorporated therein" as described in the second advantage may simply be repeated infinitely.

To summarize the first to third advantages as described above, the advantages of the information processing apparatus according to the present invention are capable of freely creating a playlist with an ideal reproduction order for a user independent from the creation timing or length thereof.

An information processing apparatus to which the present invention is applied is not limited to the example in FIG. 1, but various configurations may be adopted.

More specifically, for instance, the present invention is applied to a content reproducing device having a functional configuration as shown in FIG. 10. Namely, FIG. 10 shows an example of another configuration (different from that in FIG. 1) for the information processing apparatus to which the present invention is applied.

In FIG. 10, a contents storing section 111 to operating section 114 and a contents reproducing section 118 each have basically the same configurations and functions as in the contents storing section 11 to operating section 14 and the contents reproducing section 18 respectively.

However, different from the fact that the basic process unit for the content reproducing device in FIG. 1 is defined as a playlist (recommended playlist), the basic process unit for the content reproducing device in FIG. 10 is defined as a simple content (recommended content).

Namely, the content reproducing device in FIG. 1 has the object to reproduce a plurality of contents so that the reproduction order for the plurality of contents is optimal for a user, and in order to achieve this object, the content reproducing device creates a recommended playlist to present it to the user. In the contrary, the content reproducing device in FIG. 10 has the object to reproduce an optimal content for a user from a plurality of contents, and in order to achieve this object, the content reproducing device decides a recommended content and presents identifiable information about the decided content (a name and the like of the recommended playlist) to the user.

Because of the feature as described above, different from the content reproducing device in FIG. 1 in which the recommended playlist creating section 15 and recommended playlist presenting section 16 are provided, in the content reproducing device in FIG. 10, a recommended contents deciding section 115 and a recommended contents presenting section 116 are provided. It is to be noted that, the recommended contents deciding section 115 and recommended contents presenting section 116 have substantially the same configurations and functions as in the recommended playlist creating section 15 and recommended playlist presenting section 16 respectively, excepting the difference of the process unit, namely the object as described above.

More specifically herein, the recommended contents deciding section 115 is provided with a recommended content candidate deciding section 131 and a recommended contents selecting section 132.

The recommended content candidate deciding section 131 decides a specific number of contents as recommended contents candidates from all the contents stored in the contents storing section 11.

Next, the recommended contents candidate deciding section 131 causes an evaluating section 117 to execute the following process to acquire a result of the process in the evaluating section 117. Namely, the evaluating section 117 computes each of the evaluation values for all of the recommended contents candidates by comparing respective frequency analysis results of the feature quantities for all of the recommended contents candidates with the ideal fluctuation respectively. The evaluation values for all of the recommended contents candidates are each supplied from the evaluating section 117 to the recommended contents deciding section 115. Detailed description for the evaluating process in the evaluating section 117 will be made hereinafter with reference to FIG. 11.

When each of the evaluation values for all of the recommended contents candidates is supplied from the evaluating section 117, the recommended contents deciding section 115 and recommended contents selecting section 132 select a recommended contents candidate having the highest value of all the recommended contents candidates as recommended contents.

Then, the recommended contents selecting section 132 generates information for identifying the recommended contents (a name and the like) to present the generated information to the user from the recommended contents presenting section 116.

As described above, the evaluating section 117 in FIG. 10 computes evaluation values for the recommended contents candidates instead of evaluation values for recommended playlist candidates.

Because of the feature, the evaluating section 117 has a functional configuration in FIG. 11 which is slightly different from the functional configuration in FIG. 2 (the functional configuration example for the evaluating section 17 in FIG. 1). Namely, FIG. 11 shows an example of the functional configuration for the evaluating section 117. The detailed example of the functional configuration for the evaluating section 117 is described with reference to FIG. 11 hereinafter.

As shown in FIG. 11, the evaluating section 117 includes a contents acquiring section 133 to an evaluation value computing section 138.

From the recommended contents deciding section 115, recommended contents candidates to be evaluated are sequentially supplied one by one. Then, a contents acquiring section 133 acquires the recommended contents candidates one by one supplied sequentially from the recommended contents deciding section 115 to supply the acquired recommended contents candidates to a contents feature quantity acquiring section 134.

It is to be noted that the recommended contents candidates acquired by the contents acquiring section 133 are remarkable contents as process targets for the evaluating section 117, thus required to differentiate from other contents. In the following descriptions, the recommended contents candidates acquired by the contents acquiring section 133 are referred to as noticeable contents.

When recommended contents are supplied from the contents acquiring section 133, the contents feature quantity acquiring section 134 acquires the feature quantity information about each of the noticeable contents for various types of feature quantities from the feature quantity storing section 113 respectively.

Then, the contents feature quantity acquiring section 134 sequentially sets the various types of feature quantities to the noticeable feature quantities respectively, and supplies the feature quantity information about each of the noticeable contents for the noticeable feature quantities to a frequency analyzing section 135.

When the feature quantity information of each of the noticeable contents for the noticeable feature quantities is supplied, the frequency analyzing section 135 executes frequency analysis for the feature quantity information. A result of the frequency analysis, namely, information indicating a distribution of frequency component of the feature quantity information for each of the noticeable contents for the noticeable feature quantities is supplied to a correlation degree computing section 136.

In the following descriptions, the information indicating a distribution of frequency component of the feature quantity information for each of the noticeable contents for the noticeable feature quantities is referred to as a frequency analysis result for each of the noticeable contents.

Further, specific method of executing the frequency analysis is not particularly limited like in the frequency analyzing section 35 in FIG. 2 as described above, and for instance, the FFT may be applied to the method.

When the frequency analysis result of each of the noticeable contents for the noticeable feature quantities is supplied from the frequency analyzing section 35, the correlation degree computing section 136 acquires ideal fluctuation for the noticeable feature quantity from an ideal fluctuation storing section 122. And then the correlation degree computing section 136 computes a degree of correlation between the frequency analysis result and the ideal fluctuation. Namely, the correlation degree computing section 136 computes a value indicating how much the frequency analysis result of the noticeable contents for the noticeable feature quantity approximates the ideal fluctuation for the noticeable feature quantity.

In the following descriptions, a degree of similarity between a frequency analysis result of specific contents for a specific type of feature quantity and an ideal fluctuation for the specific type of feature quantity is referred to as a degree of similarity between a frequency analysis result for a specific type of feature quantity and ideal fluctuation. Alternatively, it may be sometimes referred to as a degree of similarity for a specific type feature quantity.

The correlation degree for the noticeable feature quantity computed by the correlation degree computing section 136 is stored in a correlation degree storing section 137.

In this operation, the correlation degree computing section 136 also notifies about termination of the processing for the noticeable feature quantity (storage of the correlation degree for the noticeable feature quantity in the correlation value storing section 137) to the contents feature quantity acquiring section 134 and the evaluation value computing section 138.

The contents feature quantity acquiring section 134 and the evaluation value computing section 138 recognize that the feature quantity of the type which had been the noticeable feature quantity has been processed based on the contents notified from the correlation degree computing section 136, then determining whether any feature quantities of the type not has been processed (unprocessed type of feature quantity) are present or not.

When determining that unprocessed types of feature quantities are present, the contents feature quantity acquiring section 134 newly sets a specific type of feature quantity from the unprocessed types as a noticeable feature quantity. Then, the contents feature quantity acquiring section 134 to the correlation degree computing section 136 each execute the processes described above for the new noticeable feature quantity. As a result, the correlation degree for the new noticeable feature quantity is stored in the correlation value storing section 137. Namely, the degree of correlation between the frequency analysis result of the feature quantity information of the noticeable contents for the new noticeable feature quantity and the ideal fluctuation for the new noticeable feature quantity is stored in the correlation value storing section 137.

When it is determined that unprocessed types of feature quantities exist, then the evaluation value computing section 138 is kept in the stand-by state during the process above.

After the operation described above, unprocessed types of feature quantities are sequentially set as new noticeable feature quantities, and the series of the processes as described above is executed with the contents feature quantity acquiring section 134 to the correlation degree computing section 136 for each time a new noticeable feature quantity is set. As a result, finally, respective correlation degrees for all types of feature quantities, namely, respective correlation degrees between each of the frequency analysis results of the feature quantity information of each of the noticeable contents for all types of feature quantities and ideal fluctuation are stored in the correlation value storing section 137 respectively.

As a result of the processing as described above, the contents feature quantity acquiring section 134 and the evaluation value computing section 138 determine that unprocessed types of feature quantities do not exist (or all types of feature quantities have been processed), and the contents feature quantity acquiring section 134 terminates the above processing while the evaluation value computing section 138 starts the following process.

Namely, the evaluation value computing section 138 acquires correlation degrees for all types of feature quantities stored in the correlation value storing section 137, and decides evaluation values of the noticeable contents (determining in a comprehensive manner) based on the acquired correlation values to supply the decided evaluation values to the recommended contents deciding section 115. The higher the evaluation value of the noticeable contents is, the higher will be the probability for the noticeable contents (recommended contents candidate) being decided as recommended contents.

As described above, weighting factors for each of the types of feature quantities are sometimes stored in the ideal fluctuation storing section 22.

In the case as described above, the evaluation value computing section 138 further acquires correlation degrees for all types of feature quantities from the correlation value storing section 137, and also acquires weighting factors for all types of feature quantities from the ideal fluctuation storing section 122, and then the evaluation value computing section 138 can decide evaluation values of the noticeable contents based on these correlation degrees and weighing factors (determining in a comprehensive manner).

More specifically, for instance, as described above, it is assumed that n-types of feature quantities exist and any of the number from 1 through n is assigned to each of the types of feature quantities. Also it is assumed that a correlation degree for a number-k feature quantity is described as Ck, and a weighting factor for the number-k feature quantity is described as Wk. It is assumed to indicate that the correlation is higher (approximate) as the correlation degree Ck becomes higher and higher, while the importance degree is higher as the weighting factor Wk becomes larger and larger.

In this case, when an evaluation value of a noticeable playlist is described as Score, the evaluation value computing section 138 can decide the evaluation value Score for the noticeable contents by computing, for instance, through the equation (1) as described above.

The detailed example of the functional configuration for the evaluating section 117 was described above with reference to FIG. 11.

As described above, the process unit for the recommended contents deciding section 115 and the evaluating section 117 is defined as a simple content, so that also the process unit for the reproduction history acquiring section 119 to the ideal fluctuation storing section 122 should be simple contents. Other functions and configurations for the reproduction history acquiring section 119 to the ideal fluctuation storing section 122 may be basically the same as those for the reproduction history acquiring section 19 to the ideal fluctuation storing section 22 respectively.

In the above example, it is assumed that a recommended playlist includes a plurality of contents, however, when it is redefined that the recommended playlist may be include one content, the recommended content should be the recommended playlist with only one content included therein.

From the point of view as described above, the content reproducing device functions in FIG. 10 (the deciding function and presenting function of the recommended contents) can easily be mounted without changing the functional configuration for the content reproducing device in FIG. 1. Namely, functions for the contents storing section 111 to the ideal fluctuation storing section 122 are simply added to the contents storing section 11 to the ideal fluctuation storing section 122 in FIG. 1, respectively. This allows an easy realization of a content reproducing device having both of the recommended playlist creating function (including the presenting function) and the recommended contents deciding function (including the presenting function).

In this operation as described above, the processing for realizing the recommended contents deciding function (including the presenting function), for instance, may be basically the processing with the same flow as in the recommended playlist creating process in FIG. 8 (including the noticeable playlist evaluating process in FIG. 9). Differences in processing in each step should be described with the explanation which was described as the corresponding function blocks (and the description with reference to related drawings for the differences in the processing are omitted herefrom).

The above series of processes, as described above, can be executed by the hardware, but also executed by the software.

In this case, the content reproducing device in FIG. 1 or FIG. 10, for instance, may be configured with a personal computer as shown in FIG. 12.

In FIG. 12, a CPU (Central Processing Unit) 201 executes various processes according to a program stored in a ROM (Read Only Memory) 202, or a program loaded to a RAM (Random Access Memory) 203 from a storing section 208. Further data and the like required for the CPU 201 to execute various processes is stored in the RAM 203 accordingly.

The CPU 201, ROM 202, and RAM 203 are coupled with each other via a bus 204. Further coupled to the bus 204 is an input/output interface 205.

Coupled to the input/output interface 205 are an inputting section 206 including a keyboard, a mouse and the like, an outputting section 207 including a display and the like, the storing section 208 including a hard disk and the like, and a communicating section 209 including a modem, a terminal adaptor and the like. The communicating section 209 executes the communication processing with other information processing apparatuses (not shown) via a network including the Internet.

Further in the input/output interface 205, a drive 210 is coupled thereto according to the necessity, and a removable recording medium 211 including a magnetic disk, an optical disk, a magneto optical disk, or a semiconductor memory and the like are provided accordingly, and computer programs read out from the removable recording medium 211 are installed to the storing section 208 according to the necessity.

When the series of processes is executed with the software, a program constituting the software is installed from the network or the recording medium, for instance, to a general-purposed personal computer capable of executing various functions by installing a computer incorporated within a dedicated hardware or by installing various types of programs.

The recording medium including such programs, as shown in FIG. 12, is configured not only by a magnetic disk with programs recorded thereon (including a floppy disk), an optical disk (including a CD-ROM (Compact Disk-Read Only Memory), a DVD (Digital Versatile Disk)), an magneto optical disk (including a MD (Mini-Disk)), or a removable recording medium (a package medium) 211 including a semiconductor memory and the like which are distributed to the users for providing programs apart from the device main body, but also configured with the ROM 202 with programs recorded thereon or a hard disk included in the storing section 208 which are provided for users in the state where previously incorporated within the device main body.

It is needless to say that in the present specification, the steps describing the programs to be recorded on the recording medium should include the processes executed based on the time series along the order thereof, but also include the processes executed in parallel or independently, even not necessarily being processed based on the time series.

Further, in the present specification, a system should be referred to as the entire device configured with a plurality of devices or processing sections.

While a preferred embodiment of the present invention has been described using specific terms, such description is for illustrative purpose only, and it is to be understood that changes and variations may be made without departing from the spirit or scope of the following claims.

What is claimed is:

1. An information processing apparatus comprising:
   a first generating unit for generating first information indicating time change in a level of a prespecified feature quantity within a reproduction period when one or more contents are sequentially reproduced according to a prespecified reproduction order;
   a second generating unit for generating second information indicating a distribution of frequency components of said prespecified feature quantity included within said reproduction period through frequency analysis of the first information generated by the first generating unit;
   a storing unit for previously storing third information indicating a distribution pattern previously determined as ideal to a user among a plurality of distribution patterns of frequency components of said prespecified feature quantity;
   a correlation degree computing unit for computing a degree of correlation between said second information generated by said second generating unit and said third information stored in said storing unit;
   a candidate creating unit for creating M sets of playlist candidates indicating M types of reproduction orders (M is an integer not less than 2 and not more than a factorial of L) each as a candidate of a playlist indicating reproduction order determined appropriate to said user when L sets of contents (L is an integer not less than 2) are sequentially reproduced, wherein:
      said first generating unit generates M sets of said first information corresponding to each of cases in which the L sets of said contents are sequentially reproduced according to each of L types of said reproduction orders shown by the M sets of said playlists candidate created by said candidate creating unit respectively;
      said second generating unit generates M sets of said second information corresponding to the M sets of said first information generated by said first generating unit respectively; and
      said correlation degree computing unit computes M sets of degrees of correlation between the M sets of said second information generated by said second generating unit and said third information stored in said storing unit respectively; and
   a playlist selecting unit for selecting, based on the M sets of degrees of correlation, a playlist indicating a reproduction order determined as appropriate to said user from among the M sets of said playlist candidates generated by said candidate creating unit.

2. The information processing apparatus according to claim 1, further comprising:
   a candidate deciding unit for deciding N sets or more candidate contents (N is an integer not less than 2), wherein:
      said first generating unit generates each of the N sets of said first information corresponding to the cases in which the N sets of candidate contents decided by said candidate deciding unit are reproduced each as a single body;
      said second generating unit generates each of the N sets of said second information corresponding to the N sets of said first information generated by said first generating unit, respectively;
      said correlation degree computing unit computes N sets of degrees of correlation between the N sets of said second information generated by said second generating unit and said third information stored in said storing unit; and
   a content selecting unit for selecting contents determined appropriate to the user from the N sets of candidate contents based on the N sets of degrees of correlation computed by the correlation degree computing unit.

3. A method of processing information of an information processing apparatus, said method comprising the steps of:
   generating first information indicating time change in a level of a prespecified feature quantity within a reproduction period when one or more contents are sequentially reproduced according to a prespecified reproduction order;
   generating second information indicating a distribution of frequency components in said prespecified feature quantity included within said reproduction period by analyzing frequencies of the first information;
   computing a degree of correlation between said second information and third information indicating distribution patterns previously determined as ideal to a user among a plurality of distribution patterns of frequency components of said prespecified feature quantity;
   creating M sets of playlist candidates indicating M types of reproduction orders (M is an integer not less than 2 and not more than a factorial of L) each as a candidate of a playlist indicating reproduction order determined appropriate to said user when L sets of contents (L is an integer not less than 2) are sequentially reproduced;
   generating M sets of said first information corresponding to each of cases in which the L sets of said contents are sequentially reproduced according to each of L types of said reproduction orders shown by the M sets of said playlists candidate respectively;
   generating M sets of said second information corresponding to the M sets of said first information respectively;
   computing M sets of degrees of correlation between the M sets of said second information and said third information respectively; and
   selecting, based on the M sets of degrees of correlation, a playlist indicating a reproduction order determined as appropriate to said user from among the M sets of said playlist candidates.

4. A program which is to be executed by a computer, comprises the steps of:
   generating first information indicating time change in a level of a prespecified feature quantity within a reproduction period when one or more contents are sequentially reproduced according to a prespecified reproduction order;
   generating second information indicating a distribution of frequency components in said prespecified feature quantity included within said reproduction period by analyzing frequencies of the first information;

computing a degree of correlation between said second information and third information indicating distribution patterns previously determined as ideal to a user among a plurality of distribution patterns of frequency components of said prespecified feature quantity;

creating M sets of playlist candidates indicating M types of reproduction orders (M is an integer not less than 2 and not more than a factorial of L) each as a candidate of a playlist indicating reproduction order determined appropriate to said user when L sets of contents (L is an integer not less than 2) are sequentially reproduced;

generating M sets of said first information corresponding to each of cases in which the L sets of said contents are sequentially reproduced according to each of L types of said reproduction orders shown by the M sets of said playlists candidate respectively;

generating M sets of said second information corresponding to the M sets of said first information respectively;

computing M sets of degrees of correlation between the M sets of said second information and said third information respectively; and selecting, based on the M sets of degrees of correlation, a playlist indicating a reproduction order determined as appropriate to said user from among the M sets of said playlist candidates.

* * * * *